US012644980B2

(12) United States Patent
Burlina et al.

(10) Patent No.: US 12,644,980 B2
(45) Date of Patent: Jun. 2, 2026

(54) FUSION OF RADAR AND INFRARED DATA FOR OBJECT DETECTION AND TRACKING

(71) Applicant: Zoox, Inc., Foster City, CA (US)

(72) Inventors: Philippe Martin Burlina, Rockville, MD (US); Patrick Blaes, Redwood City, CA (US); Yifan Zuo, Foster City, CA (US); Subhasis Das, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 320 days.

(21) Appl. No.: 18/239,860

(22) Filed: Aug. 30, 2023

(65) Prior Publication Data

US 2025/0076486 A1     Mar. 6, 2025

(51) Int. Cl.
    *G01S 13/86*      (2006.01)
    *B60W 40/02*     (2006.01)
    (Continued)

(52) U.S. Cl.
    CPC ........... *G01S 13/867* (2013.01); *B60W 40/02* (2013.01); *G01S 7/415* (2013.01); *G01S 13/931* (2013.01);
    (Continued)

(58) Field of Classification Search
    CPC ...... G01S 13/867; G01S 7/415; G01S 13/931; G01S 17/89; G01S 13/89; G01S 7/417;
    (Continued)

(56) References Cited

U.S. PATENT DOCUMENTS

| | | | | |
|---|---|---|---|---|
| 9,524,597 B2 * | 12/2016 | Ricci | .................. | G06Q 30/0645 |
| 9,884,623 B2 * | 2/2018 | Fasola | .................. | G06V 20/647 |

(Continued)

FOREIGN PATENT DOCUMENTS

| | | |
|---|---|---|
| CN | 111369541 A | 7/2020 |
| CN | 114155501 A | 3/2022 |

(Continued)

OTHER PUBLICATIONS

Search Report and Written Opinion for International Application No. PCT/US24/44623, Dated Dec. 11, 2024, 13 pages.

*Primary Examiner* — Nuzhat Pervin

(74) *Attorney, Agent, or Firm* — Lee & Hayes, P.C.

(57) ABSTRACT

Vehicle computing systems may receive and fuse long-wave infrared data with radar data to detect and track objects in low-visibility driving environments. In some examples, radar data including position and velocity data may be projected over infrared image data to detect, classify, and track infrared-emitting objects. Machine-learned transformer models with attention also may be trained to output object detections based on combined infrared and radar data. The fusion of infrared and radar data may be used individual and/or may be synchronized with other sensor modalities. In some examples, the fusion and analysis of infrared and radar data may be used in specific low-visibility driving environments, using low-light, fog, and shadowed areas of the environment, to detect and track infrared-emitting and/or moving objects such as pedestrians and animals that may be obscured from detection by other sensor modalities.

17 Claims, 9 Drawing Sheets

(51) Int. Cl.
  *G01S 7/41*    (2006.01)
  *G01S 13/931*   (2020.01)
(52) U.S. Cl.
  CPC ... *B60W 2420/40* (2013.01); *B60W 2420/408*
                  (2024.01)
(58) Field of Classification Search
  CPC .......... B60W 40/02; B60W 2420/408; B60W
                     2420/40
  USPC ........................................................ 342/70
  See application file for complete search history.

(56)       References Cited

U.S. PATENT DOCUMENTS

| | | | |
|---|---|---|---|
| 10,553,044 B2 * | 2/2020 | Mercep | G06F 18/251 |
| 10,678,240 B2 * | 6/2020 | Pollach | G06V 20/56 |
| 10,740,658 B2 * | 8/2020 | Pollach | G06V 10/803 |
| 11,106,218 B2 * | 8/2021 | Levinson | G05D 1/2249 |
| 11,145,146 B2 * | 10/2021 | Mercep | B60W 50/0225 |
| 11,449,768 B2 * | 9/2022 | Kwant | G06N 3/09 |
| 11,587,204 B2 * | 2/2023 | Harrison | G06T 3/60 |
| 12,013,457 B2 * | 6/2024 | Urtasun | G06V 20/58 |
| 12,050,285 B2 * | 7/2024 | Popov | G06N 5/01 |
| 12,266,190 B2 * | 4/2025 | Zhao | G06V 20/58 |
| 12,307,353 B2 * | 5/2025 | Tyagi | G06N 3/08 |
| 12,412,240 B2 * | 9/2025 | Venkatesan | G06T 5/20 |
| 2016/0291145 A1 * | 10/2016 | Zeng | G01S 7/415 |
| 2018/0067488 A1 * | 3/2018 | Pollach | G06N 7/01 |
| 2018/0067490 A1 * | 3/2018 | Pollach | B60W 30/0956 |
| 2018/0068206 A1 * | 3/2018 | Pollach | G06V 20/56 |
| 2018/0120842 A1 * | 5/2018 | Smith | G01S 7/412 |
| 2018/0284265 A1 * | 10/2018 | Bilik | G01S 13/72 |
| 2019/0236862 A1 * | 8/2019 | Mercep | G08G 1/165 |
| 2019/0236865 A1 * | 8/2019 | Mercep | B60W 50/0205 |
| 2019/0391250 A1 * | 12/2019 | Cohen | G01S 13/87 |
| 2020/0174112 A1 * | 6/2020 | Xing | G01S 7/41 |
| 2020/0233060 A1 * | 7/2020 | Lull | G01S 7/4039 |
| 2021/0156963 A1 * | 5/2021 | Popov | G06N 3/0464 |
| 2021/0241026 A1 * | 8/2021 | Deng | G01S 7/497 |
| 2021/0397880 A1 * | 12/2021 | Deng | G06T 7/70 |
| 2022/0035376 A1 * | 2/2022 | Laddah | G06N 3/045 |
| 2022/0193915 A1 * | 6/2022 | Marinkovich | G05D 1/0297 |
| 2022/0215508 A9 * | 7/2022 | Harrison | G06N 3/045 |
| 2023/0090211 A1 * | 3/2023 | Alsindi | G01S 13/62 |
| | | | 342/114 |
| 2023/0094836 A1 * | 3/2023 | Kellner | G01S 13/426 |
| | | | 342/52 |
| 2023/0194664 A1 * | 6/2023 | Strauss | G06N 3/044 |
| | | | 342/196 |
| 2023/0196510 A1 * | 6/2023 | Harrison | G06N 20/00 |
| | | | 382/100 |
| 2023/0236313 A1 * | 7/2023 | Cserna | G01S 17/86 |
| | | | 342/53 |
| 2023/0245452 A1 * | 8/2023 | Tan | G06V 20/44 |
| | | | 348/143 |
| 2023/0249712 A1 * | 8/2023 | Chen | G01S 17/931 |
| | | | 701/26 |
| 2023/0260266 A1 * | 8/2023 | Karasev | G01S 13/931 |
| | | | 382/104 |
| 2023/0326215 A1 * | 10/2023 | Yu | G06V 10/62 |
| | | | 701/28 |
| 2023/0351243 A1 * | 11/2023 | Xia | G06N 3/045 |
| 2024/0192369 A1 * | 6/2024 | Chauhan | G01S 13/865 |
| 2024/0391486 A1 * | 11/2024 | Kellman | G01S 7/417 |
| 2024/0393451 A1 * | 11/2024 | Meng | G06T 7/162 |
| 2025/0022143 A1 * | 1/2025 | Li | G05D 1/021 |
| 2025/0028041 A1 * | 1/2025 | Meyer | G01S 13/42 |
| 2025/0078927 A1 * | 3/2025 | Yu | G11C 16/0483 |
| 2025/0214614 A1 * | 7/2025 | Urtasun | G05D 1/0214 |

FOREIGN PATENT DOCUMENTS

| | | | | |
|---|---|---|---|---|
| EP | 3832341 A1 * | 6/2021 | .............. | G01S 7/40 |
| WO | WO-2018047115 A1 * | 3/2018 | .......... | G06V 10/803 |
| WO | WO-2020176483 A1 * | 9/2020 | ............ | G01S 13/42 |
| WO | WO-2023158642 A1 * | 8/2023 | .......... | G01S 13/867 |

* cited by examiner

300 ⟍

700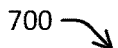

```
┌─────────────────────────────────────────────────────────┐
│   RECEIVE MULTI-MODAL SENSOR DATA OF DRIVING ENVIRONMENT  │
│                           702                             │
└─────────────────────────────────────────────────────────┘
                              │
                              ▼
┌─────────────────────────────────────────────────────────┐
│   DETERMINE VISIBILITY METRIC(S) FOR ENVIRONMENT AND/OR AREAS │
│                           704                             │
└─────────────────────────────────────────────────────────┘
                              │
                              ▼
                       ◇ LOW-VISIBILITY
                         AREAS IN              No
                         ENVIRONMENT?  ──────────────┐
                         706                         │
                              │                      │
                             YES                     │
                              ▼                      │
┌─────────────────────────────────────────────────────────┐   │
│   GENERATE COMBINED INFRARED-RADAR OBJECT DETECTIONS  │   │
│                           708                         │   │
└───────────────────────────────────────────────────────┘   │
                              │                              │
                              ▼                              │
┌─────────────────────────────────────────────────────────┐ │
│   SYNCHRONIZE OBJECT DETECTIONS ACROSS SENSOR MODALITIES  │◀┘
│                           710                             │
└─────────────────────────────────────────────────────────┘
                              │
                              ▼
┌─────────────────────────────────────────────────────────┐
│   DETERMINE OBJECT CLASSIFICATIONS/ATTRIBUTES/TRACKS      │
│                           712                             │
└─────────────────────────────────────────────────────────┘
                              │
                              ▼
┌─────────────────────────────────────────────────────────┐
│   CONTROL VEHICLE BASED ON OBJECT DETECTIONS              │
│                           714                             │
└─────────────────────────────────────────────────────────┘
```

FIG. 7

FUSION OF RADAR AND INFRARED DATA FOR OBJECT DETECTION AND TRACKING

BACKGROUND

Autonomous vehicles may include various software-based systems, hardware-based systems, and/or controllers to guide the vehicle through an environment. For example, a controller of an autonomous vehicle can use sensor data captured by sensor systems to perceive objects, predict trajectories, and plan and optimization routes to guide the vehicle through environments containing static and dynamic objects. In order to ensure safety for passengers, as well as surrounding persons and objects, while traversing through congested areas with other moving vehicles (autonomous or otherwise), moving people, stationary buildings, etc., the autonomous vehicle may receive and analyze the sensor data in various ways to make driving decisions. However, since an autonomous vehicle may include two or more different types (or modalities) of sensors and the sensor data may widely vary in its format, sensor placement, sensor characteristics, and content, the detections generated by two different sensor types may differ. Discrepancies between the detections determined from different sensor types may cause object representations created by the vehicle to jitter and/or flicker. Further, sensors of different types also may be prone to different error variations in size, distances, and depth measurements, which may further complicate object detection and tracking. For instance, sensors of different types and/or configurations may perform differently when detecting small objects, moving objects, groups of objects, and/or detecting objects in various different driving environments. Such performance discrepancies may create technical challenges that impede the operation of vehicle navigation systems, vehicle safety systems, and/or training machine-learned (ML) models.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is a flow diagram illustrating an example process for using fused infrared and radar data to perform object detection and tracking in low-visibility environments, in accordance with one or more examples of the disclosure.

DETAILED DESCRIPTION

Figure 1:
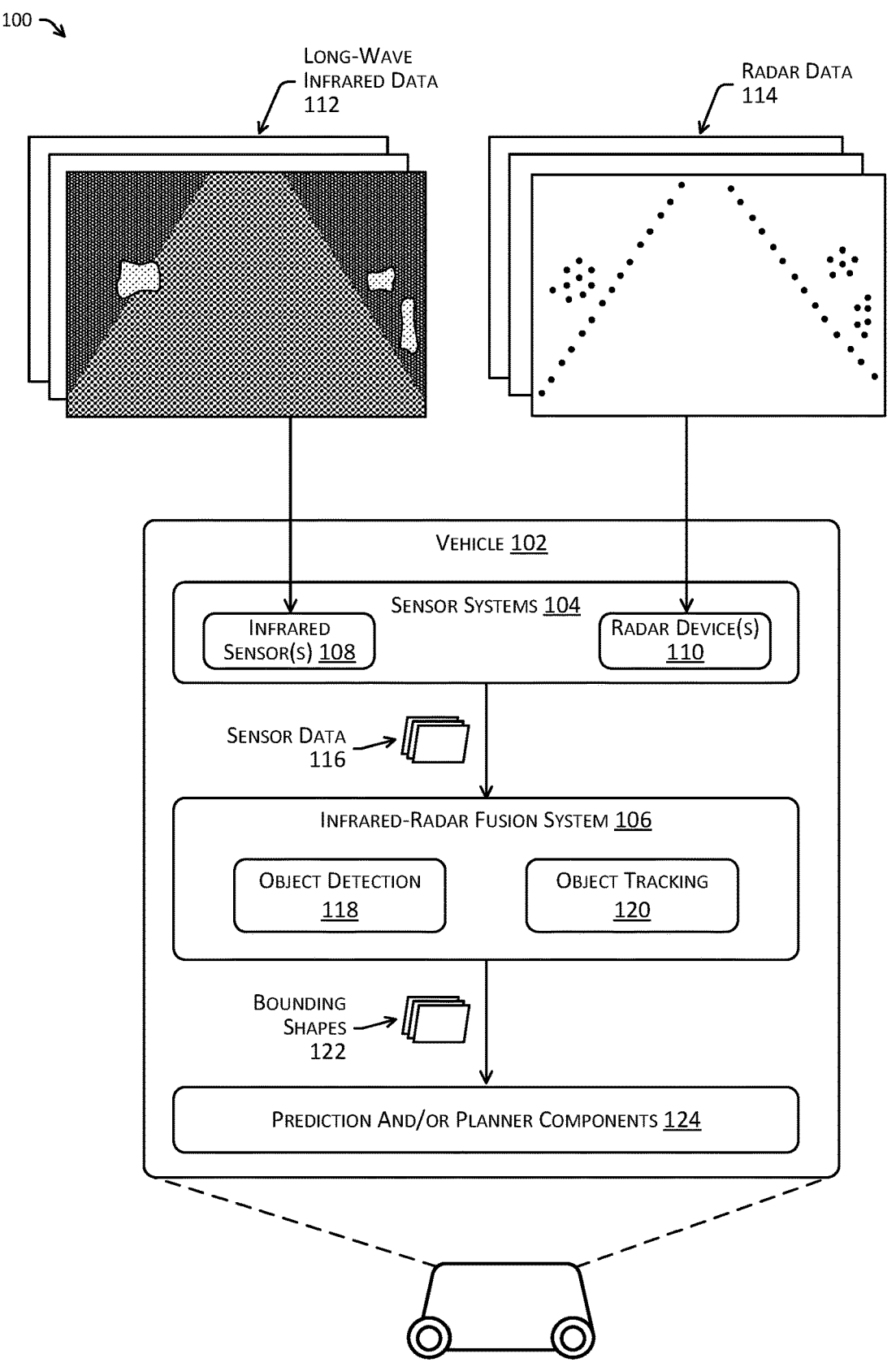
FIG. 1 illustrates an example technique of a vehicle configured to fuse infrared sensor data and radar sensor data to perform object detection and tracking capabilities, in accordance with one or more examples of the disclosure.

Techniques described herein relate to detecting, classifying, and tracking objects by vehicles in a driving environment, based on the fusion of infrared and radar sensor data. An infrared-radar fusion system of a vehicle may receive infrared data (e.g., long-wave infrared data (LWIR)) captured by infrared sensors of the vehicle, and radar data captured by radar sensors covering corresponding areas, to determine combined infrared-radar sensor views and/or object detections. In some cases, an infrared-radar fusion system may project radar points, including position and velocity data, over infrared image data to improve detection of infrared-emitting objects within the environment. Additionally or alternatively, an infrared-radar fusion system may include a machine-learned transformer model with attention trained to output object detections based on combined infrared data and radar data embeddings. The fusion of infrared and radar data described herein may provide particular advantages for detecting and tracking objects in low-visibility driving environments, such as night driving or other low-light driving, fog or rain conditions, or in tunnels or shadow areas where individual sensor modalities might not accurately detect, segment, and classify objects. Further examples described herein include synchronizing fused infrared and radar data with additional sensor modalities (e.g., RGB cameras, lidar sensors, etc.), as well as using the fused infrared and radar data conditionally in low-visibility driving environments.

In various examples, an infrared-radar fusion system may operate within a perception component of an autonomous vehicle, and may be used to detect, classify, and track objects in the environment of the vehicle. The infrared-radar fusion system may determine and output object detections, which may include bounding shapes (e.g., bounding boxes or bounding contours) and/or other data representing objects detected or perceived based on the infrared and/or radar sensor data. The inputs to the infrared-radar fusion system and/or the perception component may include multimodal and/or multispectral data captured by the various sensors of the autonomous vehicle. As described herein, multimodal data may refer to data captured by sensors of different types or modalities (e.g., RGB (or visible light) cameras, lidar sensors, radar sensors, infrared cameras, etc.), and multispectral data may refer to data obtained in different spectral bands. For example, multispectral data may be captured by separate image sensors/cameras operating in different spectral bands, such as imaging sensors for capturing visible light, infrared sensors for capturing long-wave infrared bands, etc.), and/or multispectral sensors for capturing data spanning several discrete spectral bands (e.g., ultra-violet to visible light, visible light to infra-red), and/or hyperspectral sensor(s) which may capture nearly continuous wavelengths spanning a wide range of the electromagnetic spectrum.

As noted above, the techniques described herein may be executed by a perception component within the vehicle computing system(s) of a vehicle. The perception component may include one or more object detection components that use trained machine-learned (ML) models to detect, segment, and/or classify the objects in the environment, based on input data from one or more sensor modalities (e.g., sensor types and/or spectral bands). Examples of performing object detection and tracking techniques based on multimodal sensor data can be found, for example, in U.S. patent application Ser. No. 18/104,082, filed Jan. 31, 2023, and titled "Object Detection and Tracking Using Machine Learning Transformer Models with Attention," which is incorporated by reference herein, in its entirety, for all purposes. Additional examples of techniques for determining object detections (e.g., 3D bounding regions) based on object perceptions from multimodal sensor data can be found, for example, in U.S. patent application Ser. No. 15/970,838, filed May 3, 2018, and titled "Associating Lidar Data and Image Data," and in U.S. patent application Ser. No. 16/386,249, filed Apr. 16, 2019, and titled "Multi-Modal Sensor Data Association Architecture," both of which are incorporated by reference herein, in their entirety, for all purposes. Further, examples of techniques for generating and tuning parameters for improved object detection associated with long-wave infrared sensor data can be found, for example, in U.S. patent application Ser. No. 17/247,465, filed Dec. 11, 2020, and titled "System for Tuning Parameters of a Thermal Sensor Based on a Region of Interest," which is also incorporated by reference herein, in its entirety, for all purposes.

To process and analyze multimodal sensor data, certain existing systems may use multiple processing pipelines (e.g., machine-learned pipelines) for processing sensor data and/or generating object detections, which may be developed independently for different sensor modalities. For instance, a first pipeline may determine object detections based on visible image data, a second independent pipeline may determine object detections based on lidar point cloud data, a third independent pipeline may determine object detections based on radar point cloud data, etc. Within such systems, various techniques may be used to combine the object detections (e.g., bounding shapes) from the different pipelines of different sensor types/modalities, into combined object detections that can be used to control the vehicle.

Although utilizing different sensor modalities to detect objects and determine additional information in an environment can provide a more accurate representation of the environment, processing the different modalities of sensor data in combination can present technical challenges. For example, sensor data captured from the same environment using different sensor modalities can include discrepancies in the number of detected objects, and/or in the location, size, or other attributes of the detected objects, as sensors of different modalities may capture different data and may be prone to different error variations, etc. Further, processing different modalities of sensor data in combination, such that sensor data from one modality can be used to modify detections made in sensor data from other modalities can be error-prone and computationally expensive.

Further, for certain objects and/or in certain environments, there may be no sensor modality that is individually capable of accurately detecting, segmenting, and classifying the objects. For instance, objects such as animals, pedestrians, cyclists, and/or other dynamic objects may be difficult to detect in low light or other low-visibility conditions. Visible imaging sensors (e.g., RGB cameras) may be unable to detect such objects in low-visibility conditions. Radar and lidar sensors may be able to detect objects in low-light environments, but may be unable to detect objects in other low-visibility conditions such as through fog or steam. Additionally, for objects in low-light environments, radar and lidar sensors may be unable to determine whether the objects are static or dynamic objects, and may be unable to accurately classify, segment, and/or track the objects. Infrared sensors may detect infrared-emitting objects from heat sources (e.g., animals, pedestrians, cyclists, vehicle engines, road flares, etc.) even in low light or low-visibility conditions. However, infrared sensors may provide only low-resolution infrared image data, and thus may be unable to determine accurate position and velocity data for such objects, as well as being unable to accurately segment or classify the objects.

To address the technical problems and inefficiencies of existing object detection systems, the techniques described herein may include capturing and fusing infrared data (e.g., LWIR data) and radar data to detect and track objects in low-visibility environments. In some examples, a perception component or system within a vehicle may include an infrared-radar fusion system configured to generate combined (or fused) infrared-radar sensor views, and/or to perform object detections based on the fusion of infrared and radar data within the driving environment. In these examples, the infrared data (e.g., LWIR data) may include infrared images identifying heat-emitting sources within low-visibility areas of the driving environment. The infrared images can be combined/fused with radar data, which can provide higher-resolution radar point data, including point position data (e.g., range, azimuth, and/or elevation) and point velocity data for any heat-emitting objects within the infrared data. By combining the infrared and radar data at an early stage in the object detection process, the infrared-radar fusion system can more accurately detect and analyze heat-emitting objects (e.g., animals, pedestrians, etc.) within low-visibility areas.

In some examples, an infrared-radar fusion system may be configured to generate combined infrared (IR) and radar sensor data views by overlaying radar data onto the infrared data. For instance, the infrared-radar fusion system may receive radar points from a radar device, and then project the radar points onto an infrared image. To perform such projections, the infrared-radar fusion system may be configured to initially determine (or receive) the overlapping fields of view between the various infrared and/or radar sensors used to capture the sensor data. For a sensor integrated into and/or installed on a vehicle, for example, the field of view of the sensor may be based on the position, orientation angle, and/or range of the sensor relative to the vehicle. The vehicle may include any number of infrared sensors and any number of radar sensors, and the various sensors may be positioned at different locations on the vehicle. The infrared sensors and/or radar sensors on the vehicle may overlap with other sensors of the same modality and/or sensors of different modalities. Therefore, to overlay a set of radar points onto an infrared image, the infrared-radar fusion system may initially determine the overlapping fields of view of the various sensors, which may include concatenating overlapping infrared images captured by different infrared sensors on the vehicle, and/or combining multiple radar point clouds captured by different radar devices on the vehicle.

The infrared-radar fusion system also may use various projection techniques to project the radar points onto an infrared data image (or vice versa, to project infrared data into a radar point cloud). For example, the infrared-radar fusion system may spatially align the infrared data (e.g., a 2D infrared image) with the radar data (e.g., a 3D radar point cloud), based on the relative positions and/or orientation angles of the sensor devices. The infrared-radar fusion system then may reproject the radar points onto the 2D infrared image based on the alignment of the sensor devices. In some instances, the infrared-radar fusion system may use ray casting and/or ray tracing to project the radar points onto the infrared data, by casting rays from the location of the radar sensor toward the 2D view of the infrared image, to determine the ray intersection points for each radar point relative to the 2D infrared image. Using a sensor data view including radar points projected onto infrared data, the infrared-radar fusion system may execute one or more trained models configured to detect, segment, classify, and/or track objects within the combined sensor data view.

Additionally or alternatively, the infrared-radar fusion system may include a machine-learned transformer model (or other deep neural network) trained to output combined sensor data views in the form of object detections, based on infrared and radar input data. For example, a transformer model may be configured to receive input embeddings including infrared (e.g., LWIR) data and radar data. The transformer model may combine the embeddings, for instance, using an attention mechanism or via concatenation, and then provide the embeddings to the attention heads of the transformer model. The transformer model may use an encoder-decoder architecture, described below in more detail, to determine and output object detection data based on the input embeddings. In various examples, the object detection output data may include bounding shapes (e.g., 2D or 3D bounding boxes) and/or any combination of associated object attribute data (e.g., object classification, yaw, velocity, intent, etc.). In one example, a transformer model may generate output including an objectness head, a bounding box regression head, and a bounding box classification head, in which the output can be associated with or rendered onto a top-down representation and/or image domain representation of the environment. In some examples, the transformer model also may use previous infrared and radar sensor data, and/or previous object detections or object tracks determined by the transformer model, based on previous scenes in the environment, and may associate the object detections in the current scene with the previously detected objects and/or tracks from the previous scenes.

The infrared data received and used by the infrared-radar fusion system may include long-wave infrared (LWIR) data, which may be an effective modality for detecting IR-emitting objects such as animals, pedestrians, cyclists, or other small and/or moving IR-emitting objects in low light or low-visibility conditions. Therefore, various examples may refer to LWIR sensors and data. However, in other examples, the infrared-radar fusion system may be configured to receive and detect objects based on any other infrared band(s), including (but not limited to) short-wavelength infrared, mid-wavelength infrared, far-infrared, and/or near-infrared bands. As noted above, a vehicle also may include multiple infrared sensors, which may include infrared sensors at different positions on the vehicle, having different orientations and/or fields of view, and infrared sensors of different infrared bands.

The radar data received and used by the infrared-radar fusion system may include radar data detected (or captured) by one or more radar devices installed on the vehicle or otherwise associated with the environment. In some examples, a radar device may be configured to generate a plurality of individual radar points, in which each radar point includes multiple radar data components (or parameters). The different radar data components of a radar point may include, for instance, a range (or distance-to-target) data value, an elevation data value, an azimuth data value, a doppler data value, etc. In some examples, a radar detector (or radar data analyzer) associated with the radar device (and/or within the infrared-radar fusion system) may use the combination of the data components to determine clusters (e.g., subsets) of radar points that are likely to be associated with the same object in the environment. For instance, a subset of radar points clustered within similar ranges of range values (distance-to-target), doppler values, azimuth values, and elevation values may be associated with the same object, and may be evaluated as a cluster to determine the object classification, size, pose, trajectory, etc. Radar device apertures may include any number of antennae designed to transmit and/or receive radio waves. The antennae may be spaced and positioned in a particular arrangement within the aperture based on the intended use and/or purpose of the radar device. For instance, certain radar devices may be designed to receive a high-resolution representation of certain radar data parameters (or components), which may be achieved by positioning the transmission and reception antennae in a particular arrangement.

As illustrated in various examples herein, by using radar position and/or velocity data in combination with infrared data, the infrared-radar fusion system can more accurately detect and distinguish between different types of IR-emitting objects. For example, the various machine-learned models described herein (which may include transformer model(s) with attention, and/or separate object detection models based on combined infrared-radar sensor data) may be trained to use the combined infrared and radar data input to model the various kinematic behaviors of different dynamic objects. For instance, different types of animals (e.g., dogs, cats, birds, cows, horses, squirrels, etc.) may have different infrared characteristics and/or kinematic behaviors, and the ML models may be trained to detect and classify different types of individual animals and/or multiple close groupings of animals of the various types. Similarly, different types of pedestrians (e.g., individual pedestrians, groups of pedestrians, stationary pedestrians, walking or running pedestrians, pedestrians on bicycles, scooters, skateboards, or other conveyances, etc.) may have different infrared characteristics and/or kinematic behaviors, and the ML models may be trained to detect and classify different types of pedestrian object detections.

In some examples, the infrared-radar fusion system also may be configured to track detected objects over a period of time in the environment. For instance, the infrared-radar fusion system may determine and store infrared-radar signatures associated with detected objects. An infrared-radar signature may include a combined set of infrared parameters and radar parameters associated with a particular instance of a detected object. Such parameters may include the size and/or the shape of the object (e.g., based on the size/shape of the infrared detection and/or radar cluster), the object intensity (e.g., based on infrared reading and/or radar return signal), and object velocity (e.g., based on doppler radar data). Additionally or alternatively, infrared-radar signatures also may include object type/classification, position, yaw, etc. After determining and storing the infrared-radar signatures of detected objects, the infrared-radar fusion system may use the signatures to track the objects through occlusions, crowds, and/or other ambiguous environments. In some instances, the infrared-radar fusion system may use a multiple-target tracker implemented with a Kalman filter, Particle filter, or other Bayesian filter.

The techniques described herein of combining (or fusing) infrared and radar data to perform object detection in low-visibility areas can be used independently (e.g., as a stand-alone object detection system) or in conjunction with other sensor modalities and/or other object detection systems. For instance, the infrared-radar fusion system may use the techniques to determine a first set of object detections (e.g., bounding shapes), which may be combined with other sets of object detections determined based on other sensor modalities (e.g., visible image data, lidar data, etc.). In various examples, the object detections determined by the infrared-radar fusion system can be synchronized with other sets of object detections (e.g., the outputs of other machine-learned pipelines) at various stages in the object detection process. An early synchronization of the infrared-radar object detections with the object detections from other sensor modalities may refer to a synchronization that is performed immediately after the sets of object detections (e.g., bounding boxes) are generated by their respective pipelines. In contrast, later synchronizations of the infrared-radar object detections with object detections from other sensor modalities may refer to synchronizations performed after one or more object segmentation stages, object classification, object tracking, and/or prediction. In these examples, such synchronizations may be performed using transformer models and/or other networks, using techniques similar or identical to those described in U.S. patent application Ser. No. 18/104,082, filed Jan. 31, 2023, and titled "Object Detection and Tracking Using Machine Learning Transformer Models with Attention."

In some examples, the infrared-radar fusion system may be used to combine infrared and radar data and to generate object detections in all environments. However, in other examples, the infrared-radar fusion system can be executed and/or applied conditionally in low-light or low-visibility environments. For instance, one or more components within the vehicle computing systems of a vehicle may determine the lighting and/or visibility conditions of the current driving environment. When a low-light or low-visibility environment is detected, the infrared-radar fusion system can be executed and used to determine object detections based on the combined infrared-radar data. For example, low-light driving environments may include night driving, driving in tunnels or on shaded roadways, and/or driving in foggy conditions. Additionally, low-visibility areas within a driving environment can include shadowed areas or areas obscured by steam, exhaust, etc. In these environments, the vehicle computing systems may be configured to execute and rely on the object detections from the infrared-radar fusion system. Additionally, in some instances, when low-light or low-visibility conditions are detected, the object detections output by the infrared-radar fusion system may be used as an alternative to (and/or may be up-weighted relative to) object detections determined based on other sensor modalities. For instance, in low-light or low-visibility conditions, the object detections output by the infrared-radar fusion system may be up-weighted or used instead of object detections based on visible imaging systems.

In contrast, when a high-visibility environment is detected the vehicle computing systems can be configured, in some examples, either to bypass the execution of the infrared-radar fusion system or to ignore (or down-weight) the object detections output by the infrared-radar fusion system. In these examples, ignoring or down-weighting the object detections from the infrared-radar fusion system may cause the perception component to rely more heavily on the object detection systems from other sensor modalities that perform well in high-visibility environments. Additionally, hotter driving environments may cause larger amounts of heat to emit from road surfaces, buildings, and other static objects. Because these environments may cause difficulties in distinguishing infrared detections of heat-emitting dynamic objects (e.g., pedestrians, animals, etc.) from the heat emissions of road surfaces or other static objects, the vehicle computing systems can be configured to bypass the infrared-radar fusion system and/or ignore or the object detections output by the infrared-radar fusion system.

In some examples, the infrared-radar fusion system described herein may be included in (or initiated by) a secondary (or backup) perception system, to be used when a primary perception system cannot accurately detect, classify, and/or track objects in the environment. In such examples, a vehicle may include a primary perception system having one or a combination of object detection systems (e.g., machine-learned object detection pipelines), such as ML pipelines based on RGB visible image data, lidar data, radar data, and/or additional sensor modalities. For most objects and in most driving environments, the primary perception system may accurately detect, segment, classify, and track the objects with a sufficient degree of confidence. However, when the primary perception system is unable to determine with sufficient confidence whether an object is present in a low-light environment (or a particular low-visibility area of an environment), the perception component may cause the infrared-radar fusion system described herein to perform object detection within the low-visibility area as part of a secondary perception system. Similarly, when the primary perception system of the vehicle detects that an object is present in an environment but is unable to classify the object as static or dynamic with sufficient confidence, or is unable to accurately segment the object, or unable to track the object with sufficient confidence, etc., the perception component may invoke the infrared-radar fusion system as a secondary perception system to confirm the object detection and to classify, segment, and/or track the object detection.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In examples, the techniques described herein may be utilized in driver-controlled vehicles in which such a system may provide an indication to a driver of the vehicle of whether it is safe to perform various maneuvers. The techniques can be utilized in an aviation or nautical context, or in any system involving objects or entities that may be associated with behavior that is unknown to the system.

FIG. 1 depicts an example system 100 and techniques for fusing infrared sensor data and radar sensor data, performing object detection and tracking based on the combined sensor data, and controlling a vehicle 102 based on object detections from the fused infrared-radar sensor data. In some instances, the vehicle 102 may be an autonomous vehicle configured to operate according to a Level 5 classification issued by the Society of Automotive Engineers (SAE), (and/or the U.S. National Highway Traffic Safety Administration), which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. Additionally, the techniques described herein for combining (or fusing) infrared and radar sensor data, performing object detection and tracking, and controlling a vehicle may be usable by non-autonomous vehicles as well, including land vehicles, aerial vehicles, marine vehicles, etc. The techniques discussed herein also may apply to non-vehicle sensor-based systems, such as location monitoring and security systems, manufacturing systems, augmented reality systems, and the like.

As shown in this example, vehicle 102 may receive sensor data from various sensors systems 104 of the vehicle 102. The sensors systems 104 may include any number of sensors, including sensors of various different modalities capable of sensing the environment proximate to the vehicle 102. Although this example illustrates an infrared-radar fusion system 106 configured to fuse infrared data 112 from infrared sensors 108 with radar data 114 from radar devices 110, the sensors systems 104 can include various other sensor modalities/types as well. For instance, sensors systems 104 also may include image sensors (e.g., cameras), lidar sensors, time-of-flight sensors, environmental sensors, audio sensors, inertial sensors, sonar sensors, location sensors (e.g., a GPS), and various other sensors configured to capture data representing the external environment around the vehicle 102. For the infrared sensors 108, the radar devices 110, and/or the other sensor modalities within the sensors systems 104, each sensor modality may include any number of independent sensors installed on and/or integrated into the vehicle 102 at various different positions, angles, orientations, etc.

In some examples, the vehicle 102 may include separate clusters of sensors (e.g., a sensor pod) positioned at each corner of the vehicle 102 and/or on the roof of the vehicle 102. Each sensor cluster on the vehicle 102 may include one or more infrared sensors 108, one or more radar devices 110, and/or additional sensor devices/modalities. Additionally, each of the sensors within the sensors systems 104 may be configured having different (e.g., overlapping) fields of view and various different data capture characteristics, such as detection ranges, capture rates, focal lengths, focal points, color capabilities, etc., in order to capture a variety of different sensor data of the environment surrounding the vehicle 102. For example, infrared sensors 108 may include LWIR sensors, short-wavelength infrared sensors, mid-wavelength infrared sensors, far-infrared sensors, and/or near-infrared sensors, within infrared cameras, thermal imaging cameras, night vision cameras, etc. In some cases, infrared sensors 108 may be configured to capture multi-spectral data spanning several discrete spectral bands (e.g., ultra-violet to visible light, visible light to infra-red), and/or hyperspectral sensor(s) which may capture nearly continuous wavelengths spanning a wide range of the electromagnetic spectrum. Additionally, radar devices 110 may include different types of radar systems (e.g., continuous wave, Doppler, monopulse, various resolutions and ranges, etc.), each of which may be configured to capture sensor data (e.g., images or point clouds) from the environment.

As shown in this example, sensor systems 104, including infrared sensors 108 and radar devices 110, may be provided sensor data 116 to the infrared-radar fusion system 106. In some cases, sensor data 116, including infrared sensor data, radar point cloud data, and/or sensor data of any other sensor modality, may be referred to as a "sensor image." Sensor images may comprise one or more values of the sensor data (e.g., pixel values, radar point feature data, etc.) at associated locations in the image (e.g., pixel locations, points in a radar point cloud, etc.). Sensor data image(s) may be two-dimensional (2D) or three-dimensional (3D) (e.g., comprising values along an x-, y-, and z-directions in a 3D grid).

In some examples, the infrared-radar fusion system 106 may be configured to fuse a single infrared image with a single radar data image (e.g., a radar point cloud) representing a same or overlapping area of the environment. For instance, infrared data 112 and radar data 114 may represent the same region of the environment relative to the vehicle 102. Additionally or alternatively, the infrared-radar fusion system 106 may fuse multiple infrared images with multiple radar data images. For instance, the infrared data 112 (e.g., LWIR data) may include multiple infrared images representing the infrared data captured by different infrared sensors 108, which may cover different regions of the environment, may have different wavelengths and/or spectral bands, and/or may be captured at slightly different points in times. Similarly, the radar data 114 (e.g., doppler data) may include multiple radar point clouds representing radar data captured by different radar devices 110, which may cover different regions of the environment, may have different radar features or different resolutions, and/or may be captured at different times.

The infrared-radar fusion system 106 may include an object detection component 118 and an object tracking component 120. The object detection component 118 may be configured to detect objects in the environment based on a combination of the infrared data 112 and the radar data 114. The object tracking component 120 may be configured to identify and track detected objects over a period of time, including tracking particular objects through occlusions, crowds, or other ambiguous environments. In some examples, the object detection component 118 and/or the object tracking component 120 may be included within a perception system of the vehicle 102, which may detect, segment, classify, and track objects continuously as the vehicle 102 traverses the environment.

In some examples, the object detection component 118 and/or object tracking component 120 may combine the infrared data 112 and radar data 114, and then execute trained machine-learned (ML) models to detect objects based on the combined sensor data. For instance, ML models within the object detection component 118 may be trained based on combined views of infrared data images and sets of overlapping radar points, and may output data indicative of object(s) detected within the combined sensor data view. In some examples, ML models within the object detection component 118 may be configured to receive combined infrared-radar sensor views and to output a set of bounding shapes 122 (e.g., bounding boxes, bounding contours, or other polygonal data), along with various object attributes (e.g., object type/classification, object yaw, object velocity, etc.). Such ML models also may output probabilities and/or confidence scores associated with detected objects (e.g., bounding shapes) and/or any or all of the attributes determined for the detected objects.

Prior to executing an object detection ML model, the object detection component 118 may generate one or more combine infrared-radar sensor views based on the infrared data 112 and radar data 114. As described above, the object detection component 118 may use any number of sensor data fusing techniques, including projecting radar points from the radar data 114 onto an infrared image from the infrared data 112. The projection of the radar points onto the infrared image may include aligning the infrared data 112 and radar data 114 based on the relative positions and/or orientation angles of the sensor devices, and then reprojecting (e.g., modifying) the radar points based on the alignment differences of the sensor devices.

In other examples, the object detection component 118 may include one or more ML transformer models trained to output object detections based on combined infrared data and radar data embeddings. For example, a transformer model within the object detection component 118 may receive input embeddings based on the infrared data 112 and the radar data 114, using one or more attention mechanisms (or concatenation) to combine the embeddings, and then provide the embeddings to the attention heads of the transformer model. Using an encoder-decoder architecture, the transformer model may be trained to output object detection data based on the input embeddings of infrared and radar data. As with the other trained object detection ML models described herein, an ML transformer model may be trained to output a set of bounding shapes 122, including extent data and various other object attributes (e.g., object type/classification, object yaw, object velocity, etc.). ML transformer models also may output probabilities and/or confidence scores associated with detected objects (e.g., bounding shapes) and/or any or all of the attributes determined for the detected objects.

As noted above, the ML models and/or ML transformers within the object detection component 118 may be trained to semantically classify (e.g., determine an object type) for the detected objects. Because the combined infrared and radar data may be particularly effective for detecting IR-emitting objects in low-visibility region, the object detection component 118 may include models (e.g., object detection ML models and/or ML transformers) specifically designed and trained to detect and distinguish between animals, pedestrians, cyclists, etc., within low-light driving conditions and/or other low-visibility areas. For instance, ML models used by the object detection component 118 may be trained to detect pedestrians based on combined infrared-radar sensor data, including determining individual pedestrians and/or groups of pedestrians (e.g., including the number of pedestrians in a group), determining pedestrian classifications and/or different subclassifications (e.g., children versus adults, seated versus standing pedestrians, jogging or running pedestrians, etc.), and/or classifications including pedestrians riding conveyances (e.g., bicycles, scooters, skateboards, etc.) or pedestrians riding animals. The ML models used by the object detection component 118 also may be trained to detect animals in low-visibility conditions, including determining an animal classification, an animal type subclassification (e.g., dogs, cats, squirrels, birds, cows, horses, etc.), and a number of animals moving together in a group. In some examples, separate ML model(s) may be trained to identify different object classes (e.g., pedestrians, animals, etc.), and/or different subclasses within an object class (e.g., different animal types or groups, different pedestrian groups or characteristics, etc.), with each ML model generating an output indicative of presence of an object of the respective object class (and/or subclass), and a bounding shape 122 indicating the object size/extent and location within the environment, along with any number of object attributes and/or a probability or confidence score. In other examples, the ML model(s) used by the object detection component 118 may output a probability score at each pixel location of the input(s) representing a probability of the pixel location corresponding to each object class of the set of object classes (e.g., pedestrian, animal, etc.).

Within the object detection component 118, one or more object classifier models may be configured to classify the object detections based on the combination of the infrared data (e.g., identifying an IR-emitting shape at a location within the environment) and the radar point data for a subset of radar points corresponding to the IR-emitting shape. Each radar point projected onto (or otherwise associated with) the IR-emitting object may include range data, doppler velocity data, azimuth data, and/or elevation data. By analyzing the data components of the radar points projected onto the IR-emitting object, the object detection component 118 may use the models to classify the object, including distinguishing pedestrians from animals, distinguishing animals from different types of animals, distinguishing pedestrians from pedestrians riding conveyances, etc. In some examples, the object detection component 118 may use the doppler velocity component of the radar points on the object to classify an object as a dynamic object rather than a static object, and to distinguish between different types of dynamic objects, etc., based on the object velocity. Additionally, in some cases, different radar points may be projected onto (e.g., reflected back from) different portions of a pedestrian or animal, including one or more radar points projected onto the body of the pedestrian/animal and other radar points projected onto the appendages (e.g., arms or legs) of the pedestrian/animal. In these cases, the object detection component 118 may compare the relative difference in doppler velocity at different points on the object, both to classify the object as a pedestrian or a particular type of animal, and to determine the current behavior of the object (e.g., standing, jogging, running, etc.). For instance, a difference in doppler velocity between a first point on the leg of a pedestrian or animal and a second point on the body (or between points on different legs/appendages of the object) may allow the object detection component 118 to determine that the pedestrian/animal is walking, jogging, or running, etc.

In some examples, the object detection component 118 may classify detected objects based on temporal infrared and/or radar data. For example, position and/or of a detected object may be tracked over time, and characteristics of the motion (e.g., speed, yaw, uniformity of direction and speed, and the like) may be used to classify the object as a pedestrian, animal, cyclist, etc.

The capabilities of the object detection component 118 to classify object detections may be based on the quality and/or resolution of the infrared sensors 108, the radar devices 110, and/or the range of the object detections from the vehicle 102. As an example, using a relatively low-resolution radar device 110, the object detection component 118 may apply a classification model capable of distinguishing between pedestrians and large animals, and between large, medium-sized, and small animals, etc. However, using radar data from a low-resolution radar device 110, the object detection component 118 may be unable to distinguish between different types of similar sized animals. As another example, when a high-resolution radar device 110 is used, the object detection component 118 may apply different classification models capable of distinguishing between different types of similar sized animals (e.g., dogs versus cats, rabbits versus squirrels, etc.) at close or medium range distances. Using higher resolution radar and/or closer range object detections also may allow the object detection component 118 to determine the numbers of pedestrians or animals in a closely packed group. These techniques can provide additional advantages for object prediction and trajectory planning for the vehicle. For instance, distinguishing a particular type of animal may allow the prediction and/or planner components 124 of the vehicle 102 to determine more accurate predictions of the animal's movements based on the kinematic capabilities (e.g., acceleration, change-of-direction, etc.) and/or behavioral differences in the types of animals. Similarly, determining the numbers of animals and/or pedestrians in a group, along with the specific behaviors of the individuals in the group (e.g., walking, running, etc.), may allow the prediction and/or planner components 124 to more accurately predict the behavior of the group. More accurate predictions of object movements also may allow the prediction and/or planner components 124 to determine improved trajectories for the vehicle 102 traverse the environment safely and efficiently.

The object tracking component 120 may use the same (or similar) techniques used by the object detection component 118, to identify and track particular detected objects over time within the environment. For instance, the object tracking component 120 may include additional ML models trained to receive a set of object detections from the object detection component 118 (e.g., including bounding shapes, attributes, and confidence scores, etc.), and to associate the object detections with previous sets of objects detections detected during previous points in time within the environment. In some examples, the object tracking component 120 may store infrared-radar object signatures for one or more objects detected in the environment, including combined infrared parameters and radar parameters. Infrared-radar signatures may be associated with object classifications (or types) as a whole, and/or with individual instances of detected objects. The parameters stored within an infrared-radar signature may include, for instance, the x-, y-, z-dimension of the object extent (e.g., based on overlapping of radar and infrared data), the infrared intensity of the object, and/or the doppler object velocity. Infrared-radar signature data also may include object type/classification, position, yaw, and any other object detection data described herein. Using infrared-radar signatures of detected objects, the object tracking component 120 may track the objects through occlusions, crowds, and/or other ambiguous environments. In some instances, the infrared-radar fusion system may use a multiple-target tracker implemented with a Kalman filter, Particle filter, or other Bayesian filter.

Object signatures used for object detection and/or object tracking can be based on any combination of the infrared and radar data components described herein. For example, the object tracking component 120 may determine a signature for a detected object based on the size, shape, and intensity of the infrared blob generated by the object, along with the range data and doppler velocity data received from the corresponding radar points projected onto the object. In some examples, an object signature also may include data representing the relative motion of the object, that is, the motion of certain portions of the object (e.g., arms, legs, body, head, etc.) relative to other portions of the object. As described herein, these object signatures may be used for object detection, object classification (e.g., distinguishing different types of animals, distinguishing groups of pedestrians or animals, etc.), and/or object tracking. By including additional infrared and radar data features within the object signature data, these signatures may provide the infrared-radar fusion system 106 with improved capabilities for accurately detecting, classifying, and tracking particular objects within low-visibility environments. Further, although certain examples herein describe object signatures as including infrared and radar data features only, in other examples, infrared-radar object signatures also may include corresponding visible image components, lidar components, and/or data components from various other sensor modalities.

In some examples, infrared-radar object signatures used for object tracking may be generated using learned embeddings. For instance, a learned embedding may be configured to receive infrared image data (e.g., a long-wave infrared blob) and a corresponding radar point cloud, and to output a vector representing the infrared-radar signature of the object. The object tracking component 120 may then compare the vector to other vectors representing other infrared-radar object signatures in a multidimensional vector space (e.g., using a nearest neighbor search or other multidimensional proximity search). Such comparisons may allow the object tracking component 120 to determine which infrared-radar object signatures correspond to the same object at different points in time in the environment.

The use of infrared-radar object signatures may provide a number of advantages when performing object tracking. In particular, object signatures that include the doppler velocity component of the radar data may improve the accuracy and efficiency of object tracking systems, in contrast to tracking systems based on other sensor modalities that do not include a velocity component (e.g., RGB image data, lidar data, etc.). When the object signature used for object tracking includes (or is based on) a doppler velocity component, each individual sensor reading of the object may include the velocity component and thus may indicate where the object is likely to be at future points in time. In contrast, for systems where a velocity component is not included, the object tracking system may be required to capture multiple sensor readings of the object at different times, analyze the readings to determine distance differences, and then the infer the object's movement/velocity based on the distance differences. Thus, the present techniques of using object signatures based on combined infrared-radar data, including doppler velocity data, may enable the object tracking component 120 to track objects more quickly and accurately, especially in crowded, complex, and/or low-visibility driving environments.

As shown in this example, the various bounding shapes 122 determined by the infrared-radar fusion system 106 may be provided to additional components within the computing systems of the vehicle 102 and used to control the operation of the vehicle within the driving environment. For instance, the bounding shapes 122 output from the infrared-radar fusion system 106 may include an object detection, object location, object size, object shape, object classification, object yaw, etc. In some instances, these bounding shapes 122 may be sent to prediction and/or planner components 124 within the computing systems of the vehicle 102. Prediction components of the vehicle 102 may determine predicted positions, predicted velocities, predicted trajectories, etc., for the detected objects represented by the bounding shapes 122 based on attributes of the objects (e.g., pedestrian or animal, pedestrian attributes, animal type, etc.), and/or based on the other objects proximate to the object within the environment. Planner components of the vehicle 102 may determine one or more actions to perform to control the vehicle 102 based on the bounding shapes 122 (and/or additional inputs). For instance, the prediction and/or planner components 124 may determine predicted trajectories for the detected objects in the environment, and an optimal trajectory for the vehicle 102 to follow (and/or driving maneuver for the vehicle 102 to perform) based on the predicted trajectories associated with the bounding shapes 122.

The techniques described herein may improve the functioning and safety of vehicles, by providing improved detection of infrared-emitting objects within low-light driving conditions and other low-visibility environments. Techniques including fusing infrared data and radar data, and using trained models to analyze the fused infrared-radar views to detect pedestrians, animals, and other IR-emitting objects, may improve the ability of an autonomous vehicle to detect, classify, and track such objects in low-visibility environments. Being able to detect, classify, and track such objects may be critical for the overall safety and quality of autonomous driving. Further, the technologies disclosed herein may be used in conjunction with any combination of sensor modalities, such as vision (e.g., images) and/or lidar, in addition to the fused infrared-radar sensor data. Using these techniques, objects can be detected and tracked in low-visibility environment with greater certainty as to the object's location, size, velocity, yaw, and classification, etc. This is due to the ability to generate and analyze bounding shapes based on fused infrared-radar sensor modalities, with object detection models and/or in an ML transformer model, to determine bounding shapes with improved accuracy over the bounding shapes generated by the individual sensor modalities or other combinations of sensor modalities.

Figure 2A:
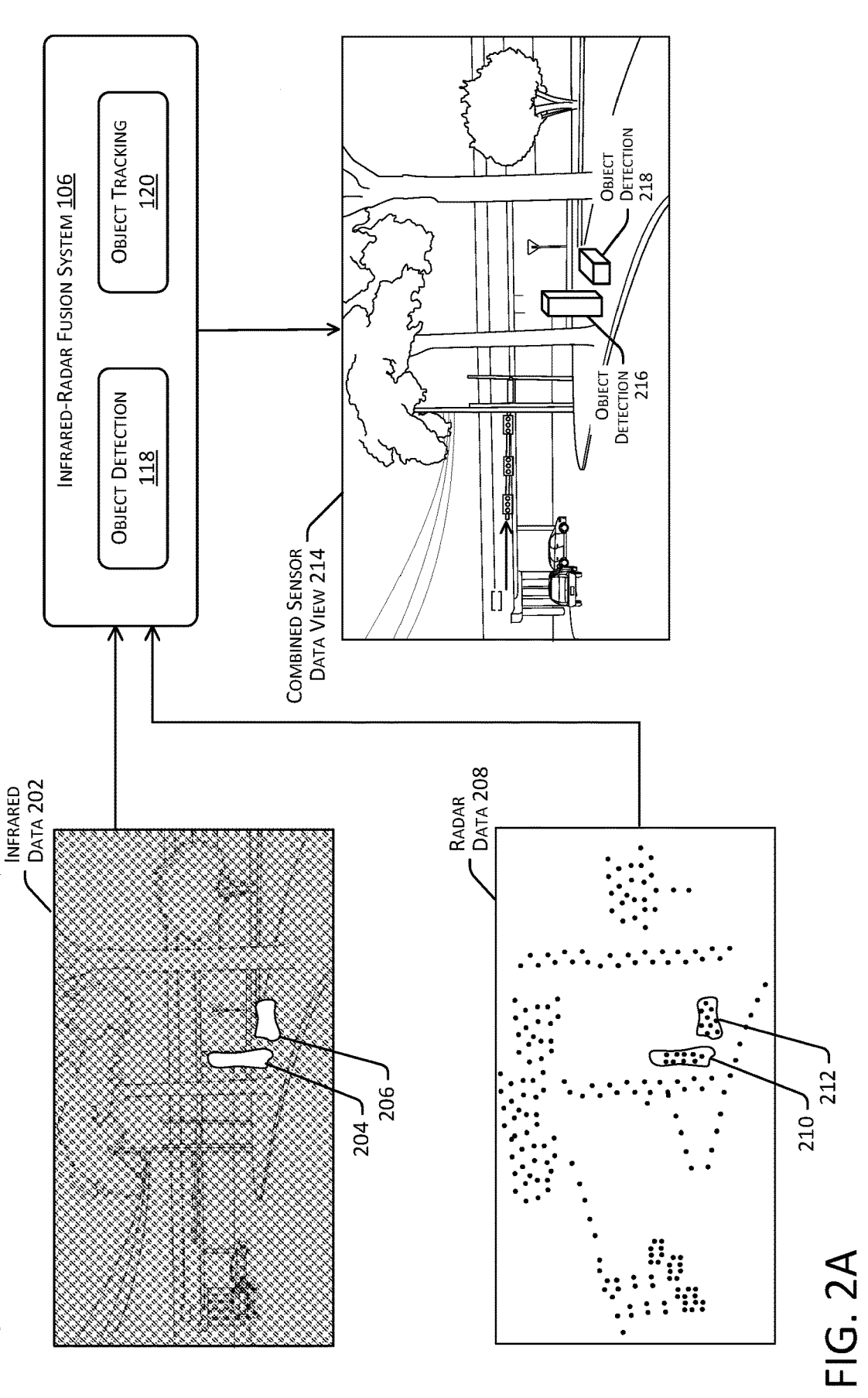
FIGS. 2A and 2B illustrate two examples of using fused infrared and radar data to perform object detection and tracking in low-visibility environments, in accordance with one or more examples of the disclosure.
Figure 2B:
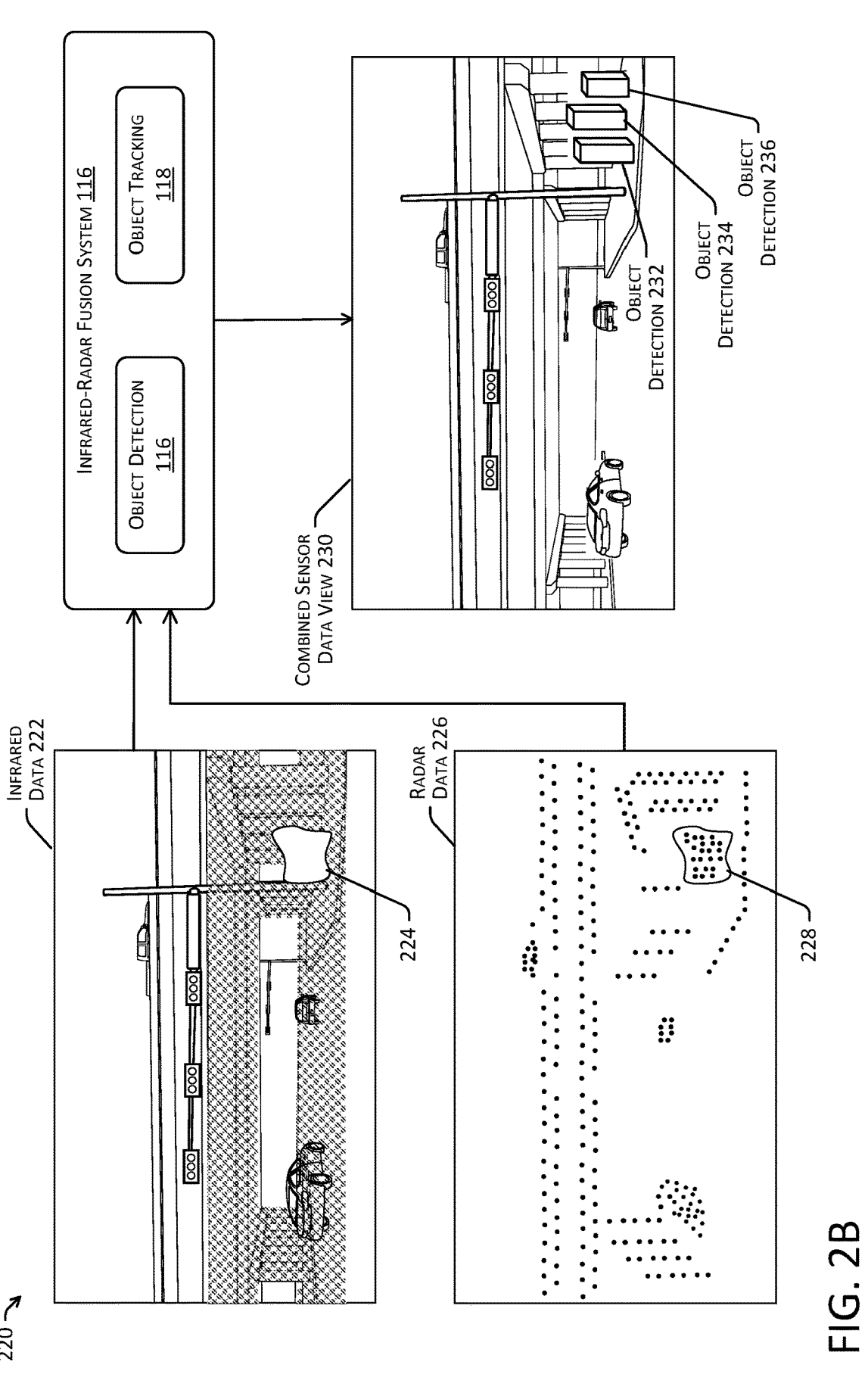

FIGS. 2A and 2B illustrate two examples of using an infrared-radar fusion system 106 for object detection. As noted above, the techniques described herein for using combining infrared and radar data may provide particular advantages for object detection and tracking in low-light driving environments and other low-visibility areas. Accordingly, FIGS. 2A and 2B depict examples of object detection within two different low-visibility driving environments.

FIG. 2A depicts a night driving environment 200, in which a vehicle 102 may use an infrared-radar fusion system 106 to perform object detection based on a combination of infrared data 202 and radar data 208. In this example, the infrared data 202 includes an infrared image including two blobs, blob 204 and blob 206, each representing IR-emitting objects within the environment 200. As shown in this example, although the infrared data 202 may include the general size and intensity of an IR-emitting blobs, these blobs have relatively low resolution and cannot be used to determine accurate bounding shapes. Further, the infrared data does not include position data or velocity data associated with the blobs 204 and 206. However, the radar data 208 for the corresponding region includes a first radar detection 210 (e.g., a first radar point cloud or portion thereof) and a second radar detection 212 (e.g., a second radar point cloud or portion thereof) corresponding to the blobs 204 and 206 in the infrared data. As described above, the infrared-radar fusion system 106 may be configured to determine the particular sets of radar points within the radar detections 210 and 212 by aligning the radar data 208 with the infrared data 202 and projecting radar points onto the infrared blobs 204 and 206. Based on the combination of the infrared data within the blobs 204 and 206 and the corresponding radar detections 210 and 212, the infrared-radar fusion system 106 may obtain extent/size data, position data, and velocity data for various locations (e.g., pixels) within each of the IR-emitting blobs 204 and 206.

Using the fusion of infrared-radar data at these locations in the environment, the infrared-radar fusion system 106 may use ML models (and/or other techniques) to analyze the combined sensor data view 214 to determine that the IR-blobs 204 and 206 represent actual heat-emitting dynamic objects such as pedestrians and animals, distinguishing those objects from static IR-emitting objects such as exhaust vents, engines, or metallic objects retaining heat from the previous day. Additionally, the ML models used by the infrared-radar fusion system 106 may execute ML object detection models and/or ML transformer models to generate object detections 216 and 218. Object detections 216 and 218 may include 2D or 3D extent data (e.g., size data) and a defined position within the environment, based on the combined infrared-radar data. Object detections 216 and 218 also may include any combination of the object attributes described herein, such as object classifications, object shape characteristics, object velocity, object yaw, etc. As shown in this example, object detection 216 may represent a pedestrian and object detection 218 may represent a medium-sized animal near the pedestrian. When the object detections 216 and 218 are provided to prediction/planning components (or other downstream sensor data analysis components), these downstream components may determine that object detections 216 and 218 are consistent with a person walking a dog and may perform prediction operations and determine trajectories for the vehicle 102 accordingly.

FIG. 2B depicts a daytime driving environment 220 including an underpass that creates a low-visibility shaded area that may impede object detection using RGB cameras. As in the previous example, the vehicle 102 may use an infrared-radar fusion system 106 to perform object detection within the low-visibility shaded area, based on a combination of infrared data 222 and radar data 226. In this example, the infrared data 222 includes an infrared image including a blob 224 representing an IR-emitting object (or objects) within the environment 220. Because the blob 224 is relatively low resolution and does not include position data, velocity data, etc., the blob 224 cannot individually be used for accurate object detection. However, the radar data 226 for the corresponding region includes a radar detection 228 (e.g., a radar point cloud or portion thereof) corresponding to the infrared blob 224. As described above, the infrared-radar fusion system 106 may be configured to determine the particular radar points within the radar detection 228 by aligning the radar data 226 with the infrared data 222 and projecting radar points onto the infrared blob 224. Based on the combination of the infrared data within the blobs 224 and the corresponding radar detection 228, the infrared-radar fusion system 106 may obtain extent/size data, position data, and velocity data for various locations (e.g., pixels) within the IR-emitting blobs 224.

As in the previous example, the infrared-radar fusion system 106 may fuse the infrared and radar data into a combined sensor data view 230, and may use ML models (and/or other techniques) to analyze the combined sensor data view to determine that the IR-blob 224 represents an actual heat-emitting dynamic object (e.g., one or more pedestrians and/or animals), rather than IR-emitting static objects. The ML models used by the object detection component 118 and/or object tracking component 120 (e.g., ML object detection models and/or ML transformer models) may determine object detections 232, 234, and 236. Object detections 232-236 may include 2D or 3D bounding shapes, with extent/size data, position data, and/or various other object attributes (e.g., classification, velocity, yaw, etc.). As shown in this example, object detections 232-236 may represent a closely spaced group of pedestrians. When the object detections 232-236 are provided to prediction/planning components (or other downstream sensor data analysis components), these downstream components may determine that these object detections are consistent with a group of people waiting to cross at the crosswalk, and may perform prediction operations and determine trajectories for the vehicle 102 accordingly.

Figure 3:
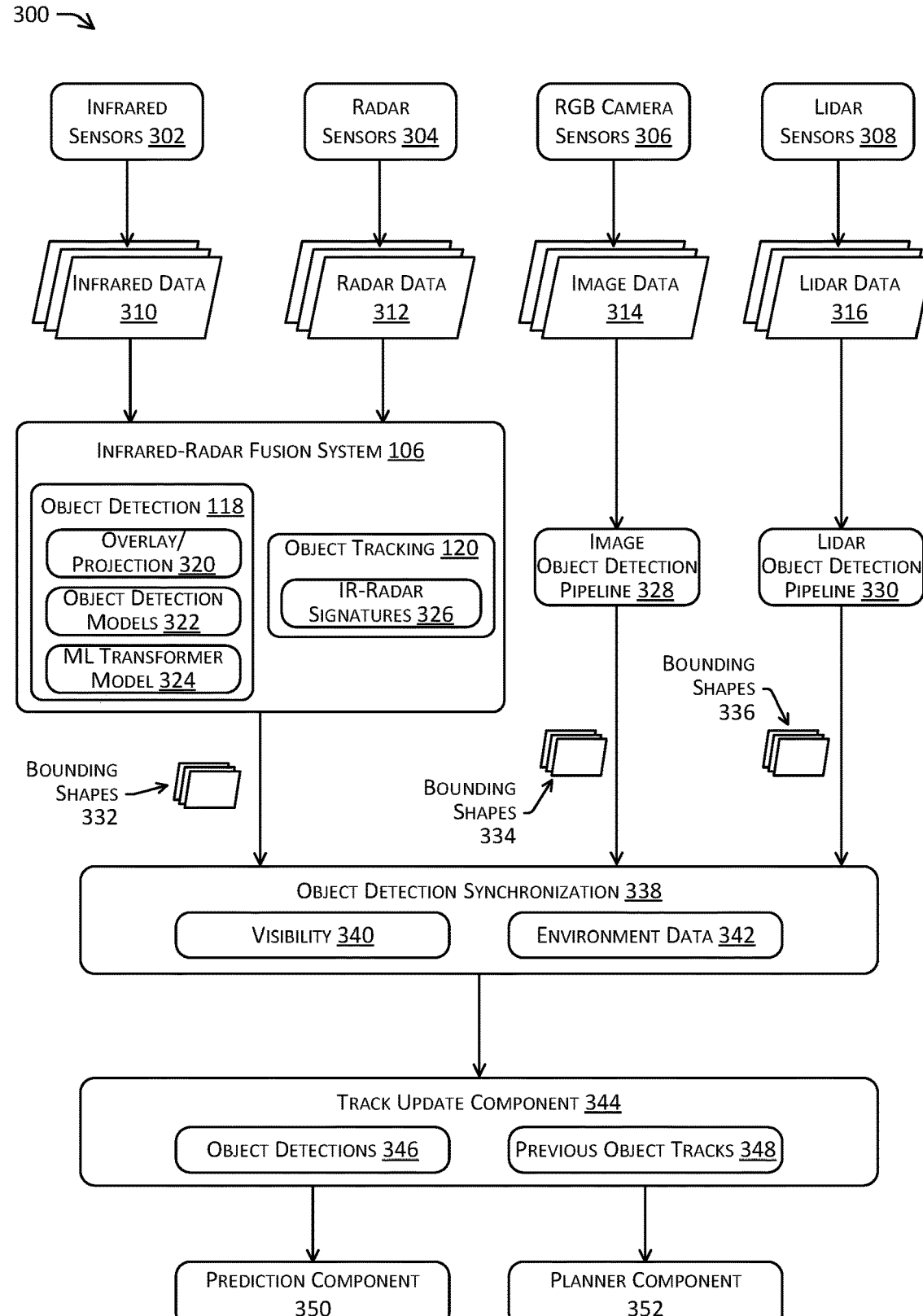
FIG. 3 illustrates an example system, including an infra-red-radar fusion system and a sensor synchronization component, configured to determine object detections based on input from different sensor modalities, in accordance with one or more examples of the disclosure.

FIG. 3 illustrates an example system 300 including an infrared-radar fusion system 106 operating within a perception component configured to perform object detection and tracking based on multi-modal sensor data. In this example, system 300 may be associated with a perception component operating within a vehicle 102, the vehicle including various infrared sensors 302, radar sensors 304, RGB sensors 306, and lidar sensors 308 (and/or additional sensor types/modalities). The sensors of system 300 may capture and provide infrared data 310, radar data 312, image data 314, and lidar data 316 (and/or additional sensor data types/modalities) to the object detection, segmentation, classification, and tracking component of the perception component.

As noted above, a perception component may include multiple object detection systems configured to operate independently and to use different sensor modalities to generate object detections. In this example, an infrared-radar fusion system 106 receives infrared data 310 and radar 312, fuses the infrared and radar data into combined sensor data views, and generates object detections based on the combined sensor data. As described above, an object detection component 118 of the infrared-radar fusion system 106 may include various subcomponents configured to perform various functionalities. An overlay/projection component 320 may be configured to fuse the infrared and radar sensor data using various sensor data fusing techniques, such as overlaying sensor images and/or projecting radar points onto an infrared image. Additional techniques performed by the overlay/projection component 320 may include determining overlapping/corresponding sensor data, and spatially and/or temporally aligning the infrared data 310 and the radar data 312 based on the relative positions orientation angles of the sensor devices, and/or the times at which the sensor data was captured.

The object detection models 322 within the object detection component 118 may include trained ML models used to detect objects and output object detection data (e.g., bounding shapes and associated object attributes) based on the combined infrared-radar sensor data. As described above, the object detection models 322 may be trained to determine object extents and positions of IR-emitting static and dynamic objects within the environment. The object detection models 322 also may be trained semantically classify the objects into type/subtype classifications (e.g., pedestrians, animals, bicyclists, etc.), and determine object attributes (e.g., yaw, velocity, etc.), that may be used by downstream components for predicting the behaviors of the objects, and for planning trajectories and driving maneuvers of the vehicle.

In various examples, the object detection models 322 may comprise convolutional neural networks (CNNs), Recurrent Neural Network (RNNs), graph neural networks (GNNs), fully convolutional networks (FCN), and the like. However, the object detection models 322 described herein may also refer to statistical models, heuristic models, rule-based models, or a combination thereof. For example, the object detection models 322 may include a statistical model that generates approximations and/or mathematical functions are usable to determine probabilities of presence and/or classification of object(s). In other words, the object detection models 322 may refer to any computational model that learns from training data to improve accuracy of an output (e.g., object detection and/or classification).

Additionally or alternatively, the object detection component 118 may include one or more ML transformer model(s) 324 trained to output object detections based on combined infrared data and radar data embeddings. In some examples, an ML transformer model 324 may generate input embeddings based on the infrared data 310 and radar data 312, and use attention mechanisms (or concatenation) to combine the embeddings. The ML transformer model 324 may provide the embeddings to the attention heads of the ML transformer model. As described above, the ML transformer model 324 may use an encoder-decoder architecture trained to output object detections based on the input infrared and radar embeddings. As described above for the object detection models 322, the ML transformer model(s) 324 also may be trained to output sets of bounding shapes, classifications, and/or other object attributes.

In this example, along with the infrared-radar fusion system 106, the system 300 may include additional object detection systems, operating independently, based on other sensor modalities. For instance, an image object detection pipeline 328 may be an ML pipeline trained to perform ML-based object detection based on RGB (visible) image data 314. Additionally, a lidar object detection pipeline 330 may be a separate ML pipeline trained to perform ML-based object detection based on lidar data 316. Each of the infrared-radar fusion system 106, the image object detection pipeline 328, and the lidar object detection pipeline 330 may operate independently based on their respective sensor modalities, and may output separate sets of time-synchronized object detections. For instance, the infrared-radar fusion system 106 may output bounding shapes 332 (including size, position data, object attributes, confidence scores, etc.), the image object detection pipeline 328 may output a separate set of bounding shapes 334, and the lidar object detection pipeline 330 may output another separate set of bounding shapes 336.

The object detection synchronization component 338 may receive the bounding shapes 332-336 from the various independent object detection systems, and may combine the object detections into a synchronized set of object detections to be provided to the downstream prediction and planning components of the vehicle 102. For example, in some cases, two or more of the different object detection systems (e.g., infrared-radar fusion system 106, image object detection pipeline 328, lidar object detection pipeline 330, etc.), can output different object detections that correspond to the same real-world object in the physical environment. Additionally, due to potential errors or inaccuracies in the modality-specific ML pipelines (e.g., over or under segmentation, misclassification, etc.), one or more of the object detection systems can output multiple object detections based on a single perceived object, and/or a single object detection based on multiple perceived real-world objects. One or more of the modality-specific ML pipelines also may output inaccurate classifications or other attributes for certain object detections.

In various examples, the object detection synchronization component 338 may use heuristics-based algorithms and/or additional trained ML models to determine a set of optimally accurate object detections based on the independent sets of object detections received from the different object detection systems. Such heuristics and/or ML models may take into account the probability data and/or confidence scores associated with the bounding shapes 332-336 received from the various object detection systems, and/or may be configured or trained to take into account the differences in accuracy between the different sensors, sensor modalities, and object detection systems in different environments.

For instance, in this example, the object detection synchronization component 338 includes a visibility component 340 and an environment data component 342. As noted above, the infrared-radar fusion system 106 may be relatively more effective at determining object detections in low-light or other low-visibility environments. In contrast, when determining object detections in high-visibility environments, an image object detection pipeline 328 may perform as well or better than infrared-radar fusion system 106. Therefore, the object detection synchronization component 338 may be configured to rely on the different sets of bounding shapes 332-336 differently, depending on the visibility metrics associated with the object detections (e.g., determined by the visibility component 340) and/or on the current environmental conditions (e.g., determined by the environment data component 342). For instance, when the visibility component 340 determines a low-visibility region of the environment and/or when the environment data component 342 determines low-light or low visibility driving conditions, then the object detection synchronization component 338 may up-weight or rely more heavily on the bounding shapes 332 determined by the infrared-radar fusion system 106. In contrast, when the visibility component 340 determines a high-visibility region of the environment and/or when the environment data component 342 determines daytime driving and high-visibility driving conditions, then the object detection synchronization component 338 may down-weight or rely less on the bounding shapes 332 determined by the infrared-radar fusion system 106. In these examples, to determine low-visibility driving environments and/or low-visibility regions within the environment, the visibility component 340 may apply one or more visibility thresholds based on the various sensor data 302-308 and/or other visibility data received by the vehicle systems.

For instance, the visibility component 340 may determine a visibility metric (e.g., a brightness level) for the driving environment (and/or for particular portions of the environment) based on the light data received from the various sensors (e.g., RGB visible-light sensors, infrared sensors, etc.). Additionally or alternatively, the visibility component 340 may determine a visibility metric for the driving environment based on the current time-of-day and/or the current environment/weather conditions (e.g., sunny, rain, fog, snow, etc.). In some cases, visibility metrics also be based at least in part on map data. For instance, a determination based on the map data of a tunnel, underpass, or a narrow street lined with tall trees or buildings (which may cause shadows during certain hours of the day) can correspond to a low-visibility condition, while the absence of such map features may correspond to a high-visibility condition. In various examples, the visibility component 340 may use any combination of these techniques, and the various other techniques described herein to determine visibility metrics corresponding to low- and high-visibility driving environments. Any of these techniques may be applied, alone or in combination, to the driving environment as a whole and/or to individual regions within the driving environment. For instance, a first area within the environment may be high-visibility area (e.g., based on light data captured from the first area, the time-of-day, clear weather conditions, etc.), and a second area within the same environment at the same time may be low-visibility area (e.g., based on light data captured from the second area, the detection of a tunnel or shaded area, etc.).

The track update component 344 may receive sets of object detections from the object detection synchronization component 338, and may determine new/updated tracks for the detected objects. As shown in this example, the track update component 344 may use object detections 346 received from the object detection synchronization component 338 (and/or from independent object detection systems), and previous object tracks 348 The previous object tracks 348 may include object track data for objects that have been previously detected and/or tracked by the system 300 at previous times in the environment. For example, the track update component 344 may retrieve a set of previous object detections, which may be similar or identical in type/format to any of the object detections described herein, but may be based on previous sensor data captured of the environment at a previous time steps. For instance, previous object detections may include object detections based on previous sensor data (e.g., previously captured image frames, lidar point clouds, radar point clouds, etc.) for any number of previous times/time steps (e.g., input/output processing cycles, etc.) of the perception component.

To determine new/updated tracks, the track update component 344 may analyze the object detections 346 for a current driving scene relative to the previous object track 348. In some cases, the track update component 344 may use attributes of the infrared-radar signatures associated with the various object detections, determined by the infrared-radar fusion system 106, to associate current object detections with previous object tracks. The track update component 344 also may use integrated box and contour estimation algorithms to determine optimally accurate and consistent object track data based on a combination of the previous and current object data. In some instances, the track update component 344 may determine track updates independently for different portions of an object (e.g., a front and a rear portion of a vehicle).

The output of the track update component 344 may include the perceived object data and track data for any number of the objects detected at a current scene in the environment. The object detections and associated track data may be used by any number of downstream processing components used to control the vehicle 102, including a prediction component 350 including functionality to generate predicted object trajectories and future states in the environment, and/or a planner component 352 configured to determine a path for the vehicle 102 to follow to traverse the environment.

Figure 4:
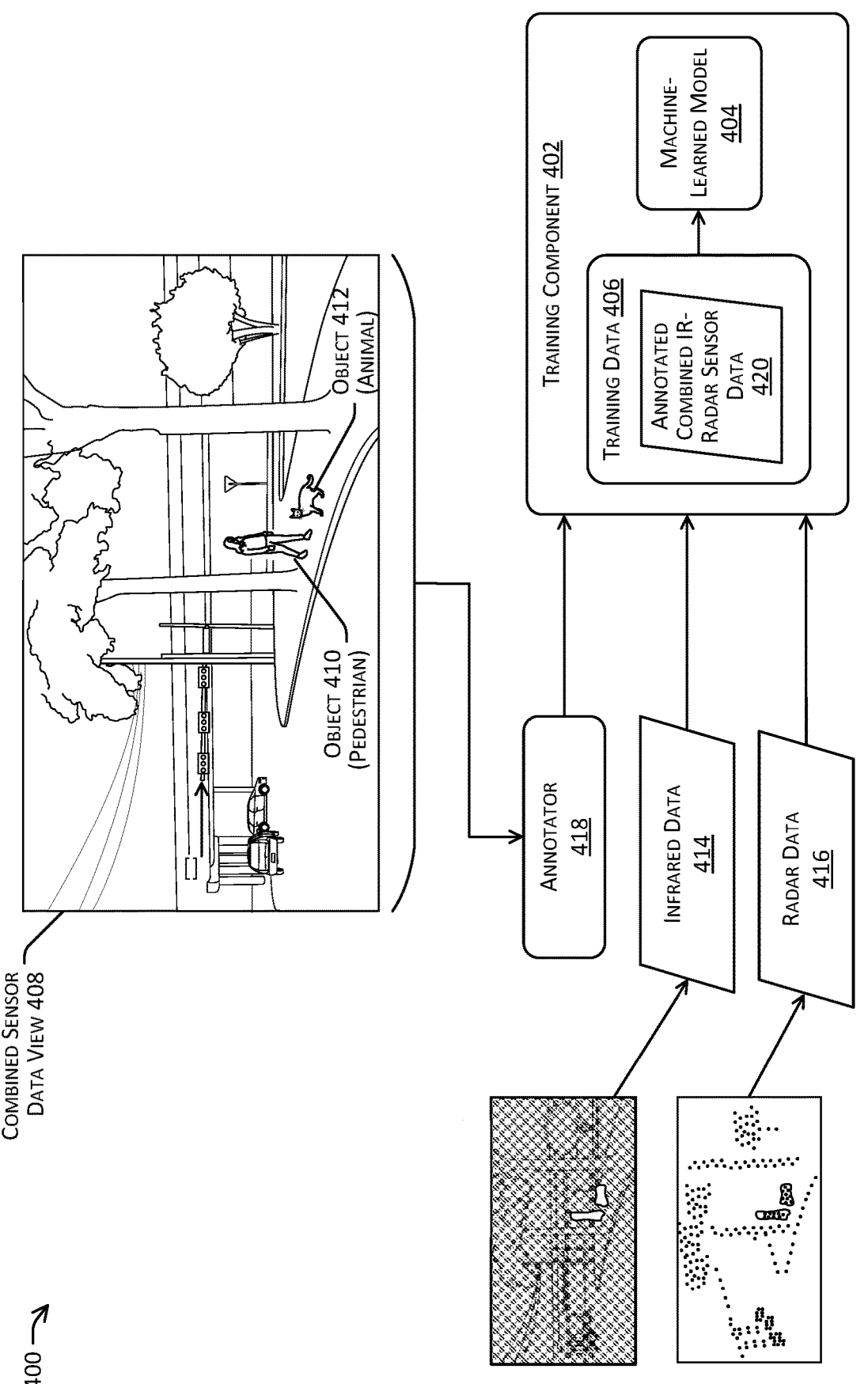
FIG. 4 illustrates a block diagram of an example technique for generating training data for training a machine-learned model for detecting objects, in accordance with one or more examples of the disclosure.

FIG. 4 illustrates an example block diagram of an example technique 400 for generating training data for training an ML model for detecting objects based on combined infrared-radar sensor data. The techniques described in the example 400 may be performed, for example, by one or more remote computing system(s) (e.g., computing system(s) separate from the vehicle 102). For example, the remote computing system(s) may implement a training component 402, for training an ML models 404 (which may be similar or identical to object detection models 322 and/or ML transformer models 324 discussed above) using training data 406. In some examples, the ML model 404 may comprise a bank of ML models (e.g., individual models, each trained to detect specific IR-emitting objects in low-visibility environments). In other examples, the ML model 404 may be trained to output one of a set of object class labels (including an output of "none" or "background") and/or additional object attributes, along with a confidence score for each class label and/or attribute.

In this example, the training data 406 may comprise input data annotated with expected output values. These expected output values may generally be referred to as "ground truth." For example, ground truth may include an identification of specific objects in the input data, as well as a semantic classification and/or class labels associated with the object (e.g., identifying and labeling an object as a particular type of animal, pedestrian, cyclist, etc.). The accuracy of the ML model 404 may be based on the quantity and/or accuracy of data provided in the training data 406. As a result, an appropriate dataset to train the ML model 404 may include a large quantity of input data (e.g., hundreds of thousands) with known, or previously determined, regions or segments corresponding to objects of interest depicted in a wide variety of relevant low-light or low-visibility backgrounds (e.g., night driving scenes, foggy or rainy driving scenes, driving scenes with shaded or shadowed regions in the environment, etc.).

In examples, the training data 406 may comprise annotated combined infrared-radar data 420, based on infrared data 414 and radar data 416. The training data 406 may include annotations based on an annotator component 418.

In various examples, the annotator component 418 may include a user interface configured to receive manual annotations of objects of interest from human operators. For instance, in manual annotation techniques, a user interface may be provided depicting a combined sensor data view 408 including based on input data from one sensor (e.g., an RGB image sensor) or a combination of multiple sensors associated with a vehicle 102. The human operator may be instructed to identify objects of interest (e.g., animals, pedestrians, etc.) and annotate the objects by indicating region(s) or segment(s) of the data corresponding to the objects, and provide a class label. However, fully manual identification and labeling of objects can be a time-consuming, inefficient, and error-prone technique for generating training data. In addition, manually annotated training data may be limited in quantity due to the time and effort required to generate such annotations, and therefore, may be inadequate for training a ML model.

Therefore, additionally or alternatively, the annotator component 418 may be implemented as an automated component on remote computing system(s) configured to annotate input data with indications of objects of interest via one or more algorithms configured to segment, detect, classify, and/or label objects in the infrared data 414, the radar 416, and/or ground truth data of other sensor modalities. However, in examples, any combination of manual annotations and automatic annotations may be used to generate the training data 406. In some examples, the annotator component 418 may be implemented on a computing system(s) separate from the remote computing system(s) implementing the training component 402.

In examples where the infrared data 414 and the radar data 416 are captured by sensors positioned on an autonomous vehicle (e.g., an infrared sensor capturing the infrared data 414, and a radar device capturing the radar data 416), the training component 402 may align the infrared data 414 and the radar data 416 in a global frame of reference or a frame of reference relative to the vehicle based on a known geometric relationship between positions of the sensors on the vehicle, angle and type of the sensors, and/or extrinsic and intrinsic parameters associated with the sensors. In examples where the geometric relationship between the sensors is not available, the training component 402 may use features of the infrared data 414 and the radar data 416 to determine the alignment. In some examples, the training component 402 may implement computer vision techniques for image registration. As a non-limiting example, the training component 402 may use SIFT or SURF-based techniques to detect and match keypoints in the infrared data 414 with corresponding keypoints in the radar data 416 to determine an alignment of the sensor data such that the matching keypoints overlap after alignment. In some cases, the training component 402 may determine a transformation such as a homography relating planar surfaces (such as building exteriors, road surfaces, etc.) in the infrared data 414 with corresponding planar surfaces in the radar data 416 to align the combined sensor data view 408. Proper alignment may be verified by verifying that other permanent structures are located in overlapping regions in the combined sensor data view 408.

In examples, the training component 402 may transfer annotations, such as bounding boxes, contours, segments, pixel-based labels, and the like, from the annotator component 418 to corresponding locations in the infrared data 414 and/or corresponding locations in the radar data 416 after alignment, along with object classification information indicated in the annotations. In the example shown, object 410 represents a pedestrian and object 412 represents an animal (or more specifically, a cat), and may be labeled accordingly via the annotator component 418. These annotations (e.g., including bounding boxes, classification labels, etc.) may be transferred to the corresponding locations/blobs in the infrared data 414, and into the corresponding regions (e.g., radar points) of the radar data 416.

In some examples, the training component 402 may further increase data points in the training data 406 by applying data augmentation techniques to the annotated infrared data 414 and/or the annotated radar data 416. For example, data points in the annotated infrared data 414 and/or the annotated radar data 416 may be modified slightly (e.g., by adding small rotations, scaling, shifts, mirroring, etc.), and added to the training data 406, along with corresponding modifications to location(s) in the annotations.

The training component 402 may train the ML model 404 based on the training data 406, which comprises the annotated combined infrared-radar sensor data 420, indicating an expected output for each input data point. To produce a valid output, a machine learned model (e.g., a CNN, RNN, GNN, FCN, etc.), such as the ML model 404, must first learn a set of parameters, or be "trained." Training is accomplished by iteratively adjusting the set of parameters of the ML model 404, using learning techniques such as backpropagation, to bring the output of the ML model 404 closer to the expected output. During the training, the annotated combined infrared-radar sensor data 420 may be provided as inputs to the ML model 404, and the corresponding annotations, as included in the training data 406, are used as target outputs, so that the ML model 404 learns an appearance associated with the objects in input data of the modality (ies) used in the training data 406. As understood in the art, in some ML architectures, only a global class label and a probability or confidence score is output by the ML model. In such examples, portions of the annotated combined infrared-radar sensor data 420 (e.g., portions corresponding to segments that have been identified as objects of interest in the annotations) may be used for training instead of data depicting an entire scene. However, in other non-limiting examples, the ML model 404 may comprise a fully convolutional network (FCN), which returns an output of the same size as input data, where the output at coordinates (x, y) includes class label(s) and pixel-level confidence score(s) (or class label probabilities) associated with a pixel at coordinates (x, y) of the input data, thus localizing the detected object(s) within the input data.

In some examples, the ML model 404 may be a pretrained model (e.g., pre-trained with a publicly available dataset such as ImageNet), and the training component 402 may implement self-supervised learning methods, where object detection in low-visibility driving scenes may correspond to a downstream task for the pre-trained model. Self-supervised learning methods do not require large training data-sets, and therefore, it may be possible to train the ML model 404 using training data 406 containing a few instances of the annotated data in accordance with a few-shot learning methodology as described herein. In some examples, when the training component 402 uses self-supervised learning to train the ML model 404, the training data 406 need not contain annotations (e.g., the training data 406 may comprise the infrared data 414 and the radar data 416 but need not be annotated).

As discussed, using sensor data with combined infrared and radar modalities to detect and classify objects may improve robustness and accuracy of object detection, segmentation, and classification. In particular, fusion of infrared and radar data described herein may provide particular advantages for detecting and tracking IR-emitting objects (e.g., animals, pedestrians, etc.) in low-visibility driving environments, such as night driving or other low-light driving, fog or rain conditions, or in tunnels or shadow areas where individual sensor modalities might not accurately detect, segment, and classify objects. As discussed herein, some objects may be more distinguishable in data of specific modality (e.g., living or warm objects may be easily detectable in infrared images, some materials may have unique signatures in certain spectral bands and therefore, be more detectable in data captured in those spectral bands, etc.). In such examples, the ML model 404 may comprise a bank of ML models each trained to detect a different class of IR-emitting objects and/or in different low-visibility environments.

In real-world scenarios, combined (and aligned) infrared-radar sensor data views may not be readily available. For example, only one modality of data may be available for a given scene, and/or of a given object. In another example, adequate numbers of training data may not be available corresponding to rare occurrences (e.g., data depicting a specific type of animal crossing a street, a pedestrian moving in a dark shaded region, etc.). To address inadequacies in availability of training data, training data 406 may include synthetic data (e.g., computer-generated) data or augmented data (e.g., data of a real-world scene modified to add objects of interest).

Figure 5A:
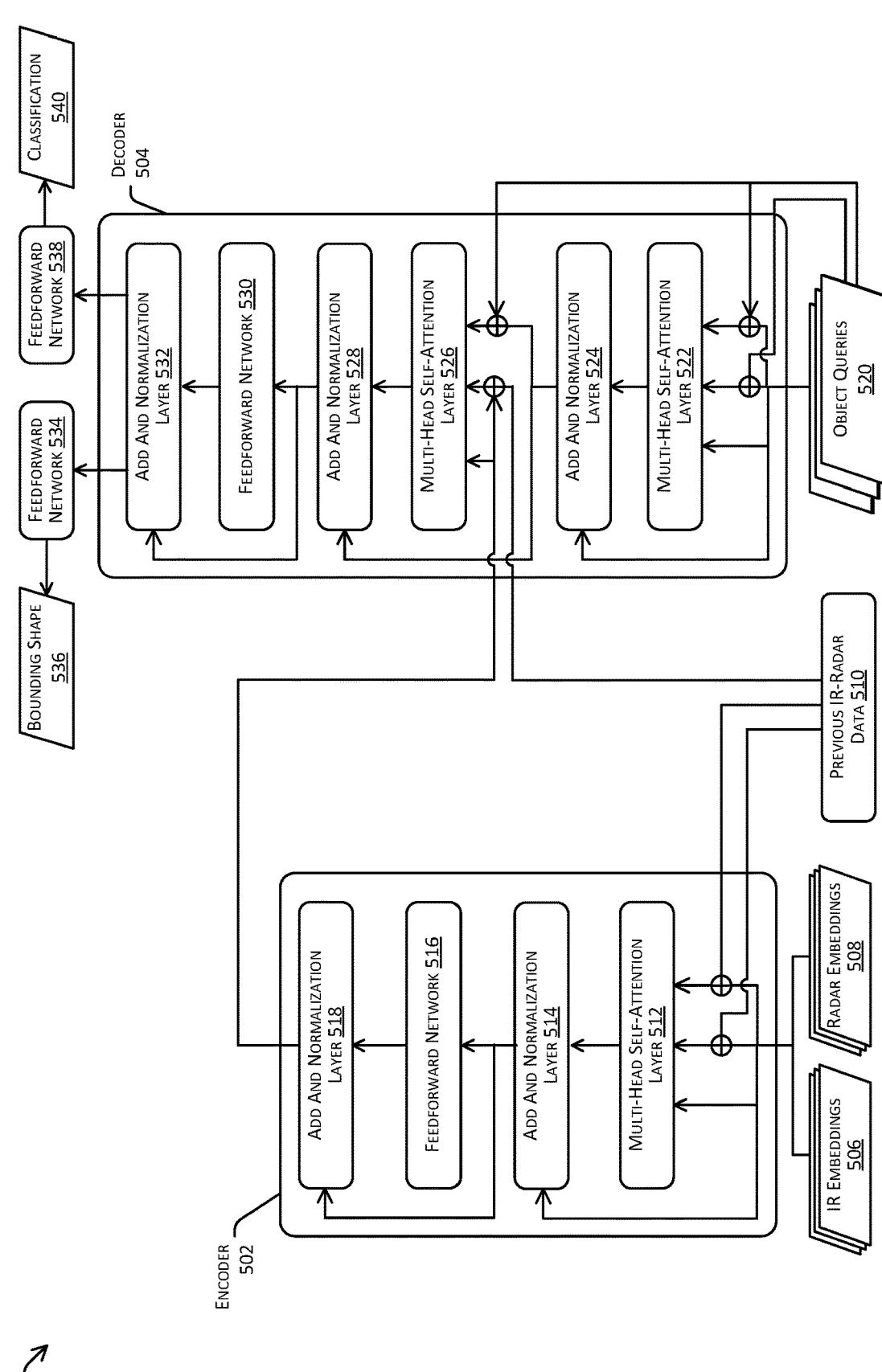
FIGS. 5A and 5B depict two different example architectures for a machine-learned transformer model that may be used for implementing various techniques described herein.
Figure 5B:
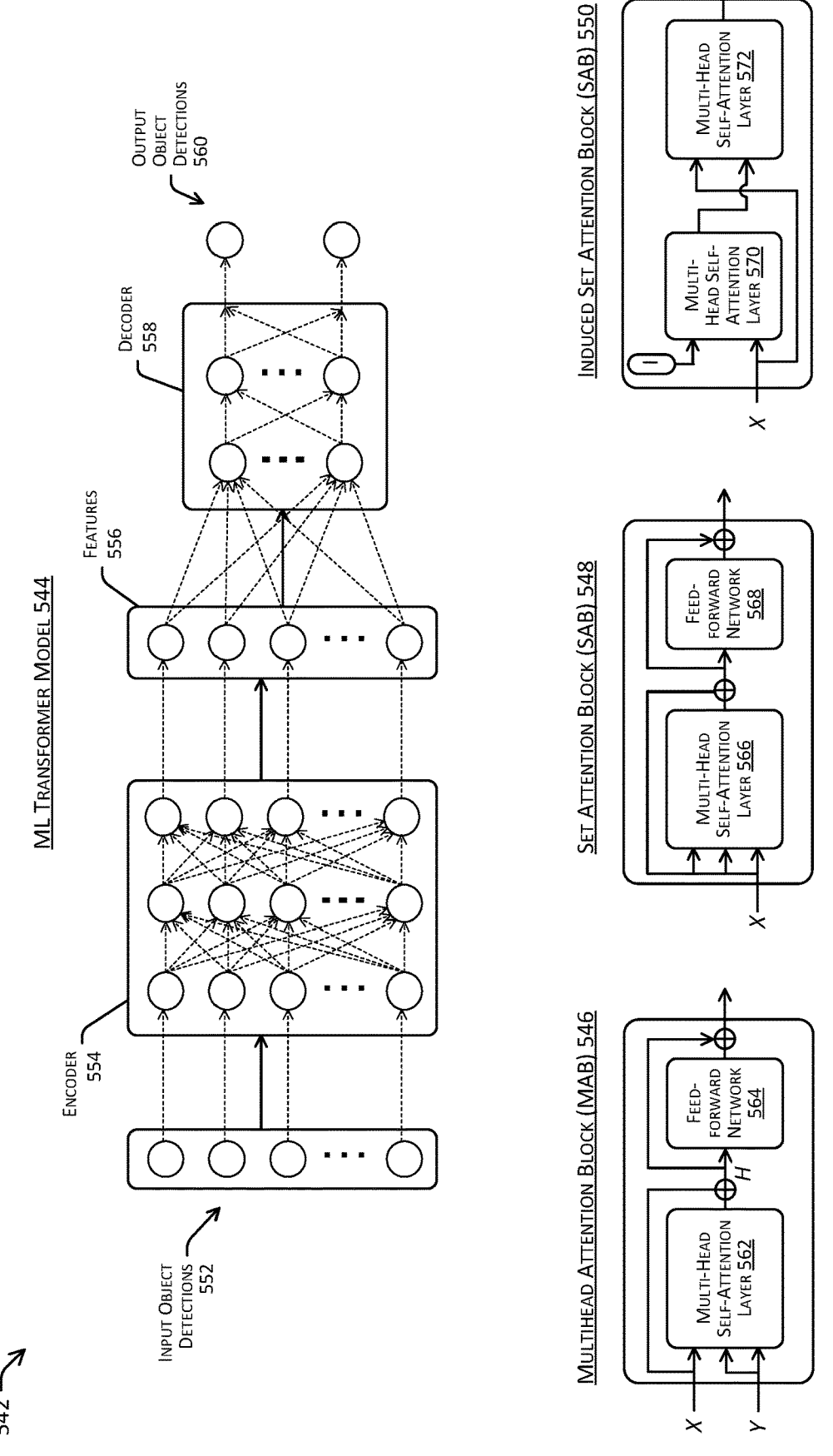

FIGS. 5A and 5B depict two example architectures for a machine-learned transformer model that may be used for implementing an infrared-radar fusion system 106. As noted above, in some examples, an infrared-radar fusion system 106 may include one or more machine-learned transformer models (and/or other deep neural networks) trained to output combined sensor data views (e.g., bounding boxes or other object detections) based on corresponding infrared and radar input data.

In this example, FIG. 5A depicts a first example transformer 500 configured to receive input sets of infrared and radar sensor data, and to output a set of object detections based on the fused/combined infrared and radar input data. As shown in this example, the transformer 500 may include an encoder/decoder architecture with self-attention. In this example, the encoder 502 may receive as input a first set of input embeddings 506 based on infrared sensor data, and a second set of input embeddings 508 based on radar sensor data. The encoder 502 also may receive previous infrared and/or radar sensor data (e.g., embeddings or raw sensor data) representing the driving environment at a previous point in time. In this example, the encoder 502 also includes a multi-head self-attention layer 512, a subsequent add and normalization layer 514, a feedforward network 516, and another add and normalization layer 518. The decoder 504 in this example receives outputs from the encoder 502 as well as object queries 520 (which may include, for example, object detection queries and/or object tracking queries). The decoder 504 in this example includes a first multi-head self-attention layer 522, a subsequent add and normalization layer 524, a second multi-head self-attention layer 526, another add and normalization layer 528, a feedforward network 530, and another add and normalization layer 532. The output of the decoder 504 may be provided to one or more downstream processing components, including an additional feedforward network 534 configured to determine and output a combined object detection (e.g., a bounding shape 536) and/or a separate feedforward network 538 configured to determine and output classification data 540 associated with the bounding shape 536.

In addition to or instead of using previous object detections, in some examples, the infrared-radar fusion system 106 may retrieve and use track data for any number of the objects previously detected and tracked by the perception component. Track data may include, for example, data defining a driving path and/or trajectory for a dynamic object in the environment. For instance, the track data for an object may be defined as a combination of a curvature (or yaw) and a velocity (or acceleration) for a sequence of one or more time points or locations in the environment. Additionally or alternatively, track data may be defined by sequences of vehicle states and/or poses, and/or continuous driving paths with velocities, accelerations, etc. The infra-red-radar fusion system 106 may use the track data for any previously detected objects to project (or otherwise predict) the locations and states of the previously detected objects at the time corresponding to the sets of object detections received from the object detection generator(s).

FIG. 5B depicts a second example transformer 542 configured to receive input sets of embeddings based on infrared sensor data and radar sensor data, and to output a set of combined/fused object detections (e.g., bounding shapes). As with the example transformer 500, transformer 542 also includes an encoder/decoder architecture with self-attention. In this example, an ML transformer model 544 is configured to receive a vector of input sensor data embeddings 552, and to use an encoder/decoder architecture (e.g., an encoder 554, features 556, and decoder 558) to transform the set of input sensor data embeddings 552 into an output of object detections 560. Also shown in FIG. 5B are three attention-based set operations: a multi-head attention block (MAB) 546 including a multi-head self-attention layer 562 and a feedforward network 564; a set attention block (SAB) 548 including a multi-head self-attention layer 566 and a feedforward network 568; and an induced set attention block (ISAB) 550 including a first multi-head self-attention layer 570 and a second multi-head self-attention layer 572.

Figure 6:
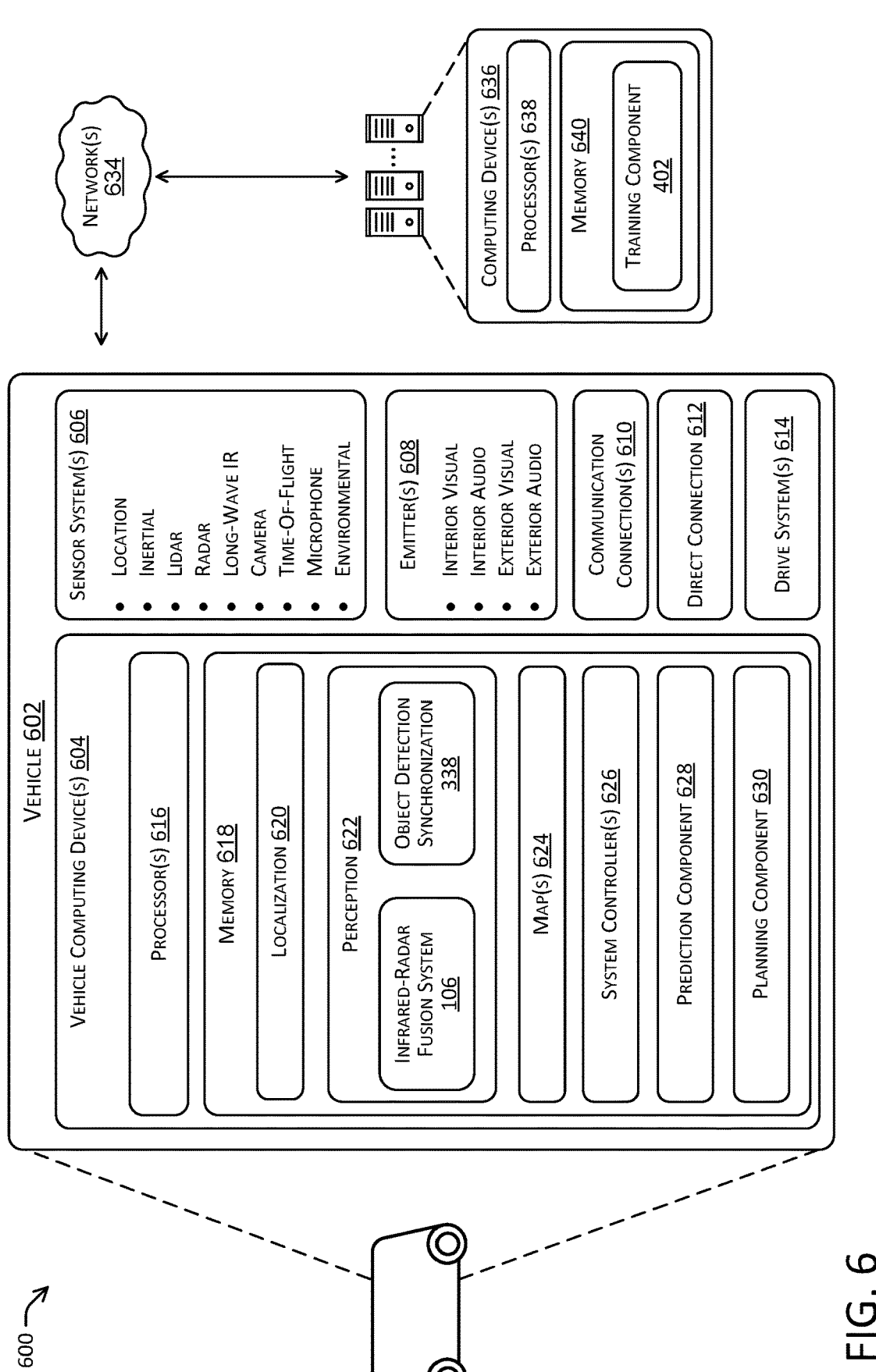
FIG. 6 depicts a block diagram of an example system for implementing various techniques described herein.

FIG. 6 depicts a block diagram of an example system 600 for implementing various techniques described herein. In some instances, the example system 600 may include a vehicle 602, which may represent the vehicle 102 discussed above in FIG. 1-6. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 602 which can be configured to perform various techniques described herein, including fusing infrared sensor data and radar sensor data for object detection and tracking, which may be deployed within the vehicle 602 while operating in a driving environment. In some examples, the vehicle 602 also may be configured to provide log data to one or more separate computing devices 636 configured to train ML transformer models as described herein. Additionally or alternatively, the vehicle 602 may receive and execute one or more ML object detection models and/or ML transformer models from separate computing devices 636, which may be integrated within a perception component configured to detect and track objects in the environment, based on fused infrared-radar sensor data, using the various techniques described herein.

The vehicle 602 may include vehicle computing device(s) 604, sensor(s) 606, emitter(s) 608, network interface(s) 610, at least one direct connection 612 (e.g., for physically coupling with the vehicle to exchange data and/or to provide power), and one or more drive system(s) 614. In this example, the vehicle 602 may correspond to vehicle 102 discussed above. The system 600 may additionally or alternatively comprise computing device(s) 604.

In some instances, the sensor(s) 606 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 636.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). For instance, the network interface(s) 610 may facilitate communication with other local computing device(s) on the vehicle 602 and/or the drive system(s) 614. Also, the network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 636. In some examples, computing device(s) 636 may comprise one or more nodes of a distributed computing system (e.g., a cloud computing architecture).

The network interface(s) 610 may include physical and/or logical interfaces for connecting the vehicle computing device(s) 604 to another computing device or a network, such as network(s) 634. For example, the network interface(s) 610 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 604 and/or the sensor(s) 606 may send sensor data, via the network(s) 634, to the computing device(s) 636 at a particular frequency, after a lapse of a predetermined period of time, in near real-time, etc.

In some instances, the vehicle 602 may include one or more drive systems(s) 614 (or drive components). In some instances, the vehicle 602 may have a single drive system 614. In some instances, the drive system(s) 614 may include one or more sensors to detect conditions of the drive system(s) 614 and/or the surroundings of the vehicle 602. By way of example and not limitation, the sensor(s) of the drive systems(s) 614 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 614. In some cases, the sensor(s) on the drive systems(s) 614 may overlap or supplement corresponding systems of the vehicle 602 (e.g., sensor(s) 606).

The drive systems(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 614 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 614. Furthermore, the drive systems(s) 614 may also include one or more communication connection(s) that enable communication by the respective drive component with one or more other local or remote computing device(s).

The vehicle computing device(s) 604 may include processor(s) 616 and memory 618 communicatively coupled with the one or more processors 616. Computing device(s) 636 may also include processor(s) 638, and/or memory 640. As described above, the memory 640 of the computing device(s) 636 may store and execute a training component 402, such as described above in reference to FIG. 4, and may be configured to perform any combination of training functionality for ML object detection models and/or ML transformer models described herein.

The processor(s) 616 and/or 638 may be any suitable processor capable of executing instructions to process data and perform operations as described herein. By way of example and not limitation, the processor(s) 616 and/or 638 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 618 and/or 640 may be examples of non-transitory computer-readable media. The memory 618 and/or 640 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and/or memory 640 may store a localization component 620, perception component 622, maps 624, system controller(s) 626, prediction component 628, and/or planning component 630. The perception component 622 may include one or more infrared-radar fusion systems 106 configured to determine object detections based on combined infrared-radar sensor data, and/or object detection synchronization components 338 configured to determine object detection associations and combined object detections from various sensor modalities, as described in the examples herein.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include map(s) of an environment and can continuously determine a location, velocity, and/or orientation of the autonomous vehicle within the map(s). In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the planning component 630 and/or to the prediction component 628, a location and/or orientation of the vehicle 602 relative to the environment and/or sensor data associated therewith.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 624 may include at least one map (e.g., images and/or a mesh) generated in accordance with the techniques discussed herein. In some examples, the vehicle 602 can be controlled based at least in part on the maps 624. That is, the maps 624 can be used in connection with the localization component 620, the perception component 622, and/or the planning component 630 to determine a location of the vehicle 602, identify objects in an environment, and/or generate routes and/or trajectories to navigate within an environment.

In some instances, the perception component 622 may comprise a primary perception system and/or a prediction system implemented in hardware and/or software. The perception component 622 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 622 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 628 may include functionality to generate predicted information associated with objects in an environment. As an example, the prediction component 628 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 602 traverses an environment. In some examples, the prediction component 628 can generate one or more predicted positions, predicted velocities, predicted trajectories, etc., for such target objects based on attributes of the target object and/or other objects proximate the target object.

The planning component 630 may receive a location and/or orientation of the vehicle 602 from the localization component 620, perception data from the perception component 622, and/or predicted trajectories from the prediction component 628, and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 626 and/or drive systems(s) 614 may parse/cause to be carried out, second instructions for the emitter(s) 608 may be formatted according to a second format associated therewith). In at least one example, the planning component 630 may comprise a nominal trajectory generation subcomponent that generates a set of candidate trajectories, and selects a trajectory for implementation by the drive systems(s) 614 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 618 and/or 640 may additionally or alternatively store a mapping system (e.g., generating a map based at least in part on sensor data), a planning system, a ride management system, etc. Although localization component 620, perception component 622, the prediction component 628, the planning component 630, and/or system controller(s) 626 are illustrated as being stored in memory 618, any of these components may include processor-executable instructions, machine-learned model(s) (e.g., a neural network), and/or hardware and all or part of any of these components may be stored on memory 640 or configured as part of computing device(s) 636.

As described herein, the localization component 620, the perception component 622, the prediction component 628, the planning component 630, and/or other components of the system 600 may comprise one or more ML models. For example, the localization component 620, the perception component 622, the prediction component 628, and/or the planning component 630 may each comprise different ML model pipelines. The prediction component 628 may use a different ML model or a combination of different ML models in different circumstances. For example, the prediction component 628 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 618 may additionally or alternatively store one or more system controller(s) 626, which may be configured to control steering, propulsion, braking, safety, emitters, communication, and other systems of the vehicle 602. These system controller(s) 626 may communicate with and/or control corresponding systems of the drive systems(s) 614 and/or other components of the vehicle 602.

In an additional or alternate example, vehicle 602 and/or computing device(s) 636 may communicate (e.g., transmit and/or receive messages over network(s) 634) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 602. For example, the passenger device may additionally or alternatively comprise a display and/or one or more input/output devices, such as a touchscreen, microphone, speaker, and/or the like. In some examples, the vehicle 602 may transmit messages and/or receive messages from the passenger device.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

FIG. 7 is a flow diagram illustrating an example process 700 for generating combined infrared-radar sensor data and using the combined data to perform object detection in low-visibility environments. As described herein, the operations of process 700 may be performed by a perception component 622 including an infrared-radar fusion system 106 (and/or the additional related components or subcomponents) as described above in reference to FIGS. 1-6. In various examples, process 700 may be performed by a perception component 722 within a vehicle 102 configured to perform object detection and/or tracking functionality for controlling the vehicle 102 within a driving environment. At operation 702, the perception component 622 may receive multimodal sensor data of a driving environment. As described herein, the multimodal data may include at least infrared data captured by one or more infrared sensors of the vehicle, and radar data captured by one or more radar devices of the vehicle. Additionally, the multimodal data received in operation 702 may include various additional data captured by sensors of different types or modalities, including RGB (or visible light) sensor data, lidar data, etc.

At operation 704, the perception component 622 may determine one or more visibility metrics for the driving environment, and/or for particular regions within the driving environment. As noted above, the infrared-radar fusion system 106 may be more effective at determining object detections in low-light or other low-visibility environments. Therefore, in some examples, the perception component 622 may determine visibility metrics associated with the environment as a whole (e.g., a brightness level) and/or associated with particular areas in the environment. For instance, the perception component 622 may use the current time, location, and environment conditions to determine low-light or low-visibility driving conditions. Such driving conditions may include night driving, driving in fog or rain, driving through a tunnel, etc. The perception component 622 also may analyze the environment to detect particular low-visibility areas within the environment, such as shaded areas, areas obscured by steam or exhaust, etc.

At operation 706, the perception component 622 may determine whether the driving environment includes one or more low-visibility areas. As noted above, during night driving, foggy or rainy driving conditions, etc., the perception component 622 may determine that the environment as a whole is a low-visibility environment (706: Yes). In other examples, the perception component 622 may determine that one or more particular areas in the environment, and not the environment as a whole, are low-visibility areas (706:

Yes). Determinations in operation 706 may be performed, for instance, based on brightness thresholds and/or RGB visibility thresholds.

At operation 708, when the perception component 622 determines that the driving environment includes one or more low-visibility areas (706: Yes), then the perception component 622 may use the infrared-radar fusion system 106 to generate combined infrared-radar sensor data. As described above, the infrared-radar fusion system 106 may include various components configured to align and fuse the infrared and radar sensor data (e.g., via an overlay/projection component 320), and may include a number of models configured to perform object detection and classification based on the fused infrared and radar data (e.g., object detection models 322 and/or ML transformer models 324). The output from such models may include object detections, which may include bounding shapes based on extent/size and object position, classification, and additional attributes such as velocity, yaw, etc.

As shown in this example, fusing the infrared and radar data and performing object detection based on the combined data may be performed conditionally by the perception component 622, in low-visibility environments and/or environment having low-visibility areas. However, as described above, in other examples, the infrared-radar fusion system 106 may be used to generate the combined infrared-radar sensor data and perform object detection based on the combined data at all times and/or in all driving environments.

At operation 710, the perception component 622 may synchronize the object detections output by various sensor modalities and/or various object detection systems. For example, the set of object detections output by the infrared-radar fusion system 106 may be synchronized with the separate sets of object detections output by an image object detection pipeline 328, a lidar object detection pipeline 330, and/or any number of additional object detections based on additional sensor modalities.

At operation 712, the perception component 622 may determine sets of object classifications, attributes, and/or tracks for the object detections determined in operation 710. As described above, classifying and determining additional attributes for the detected objects may be performed by executing separate ML models. Alternatively, the additional classification and attribute data can be output by the same ML object detection models and/or ML transformer models configured to output the object detections. Examples of object classification models may include individual ML models or combined trained to detect pedestrians in various poses (individually and in numbers), animals of various types (individually and in groups), pedestrians on bicycles, scooters, and other conveyances, and the like, based on the combined infrared-radar sensor data.

At operation 714, the perception component 622 may control the vehicle 102 based on the object detections determined in operation 710, and the associated classifications, attributes, and tracks determined in operation 712. In various examples, the object detections and associated track data determined by the perception component 622 may be used by prediction components, planning components, and/or various other downstream processing components used to control the vehicle 102. Such components may include functionality to generate predicted object trajectories and future object states within the environment, and determine driving paths or driving maneuvers for the vehicle 102 to follow to safely and efficiently navigate the environment.

Example Clauses

A. A system comprising: one or more processors; and one or more non-transitory computer-readable media storing computer-executable instructions that, when executed, cause the one or more processors to perform operations comprising: receiving long-wave infrared data associated with an environment, the long-wave infrared data generated by an infrared sensor; receiving doppler radar data associated with the environment, the doppler radar data generated by a radar sensor; determining a low-visibility area of the environment; determining, based at least in part on the long-wave infrared data and the doppler radar data, a combined sensor data view associated with the low-visibility area of the environment; providing the combined sensor data view as input to a trained machine-learned model; determining, based at least in part on an output of the trained machine-learned model, an object detection representing an object in the low-visibility area of the environment; and controlling operation of a vehicle, based at least in part on the object detection.

B. The system of paragraph A, wherein the output of the trained machine-learned model comprises classification data associated with the object detection, wherein the classification data includes at least one of: an animal classification; an animal type subclassification; a number of animals subclassification; a pedestrian classification; a number of pedestrians subclassification; or a pedestrian riding a conveyance classification.

C. The system of paragraph A, wherein determining the combined sensor data view comprises: determining an image representation of the environment based on the long-wave infrared data; and projecting a plurality of radar points from the doppler radar data onto the image representation.

D. The system of paragraph A, wherein determining the combined sensor data view comprises: determining a first embedding associated with the long-wave infrared data; determining a second embedding associated with the doppler radar data; inputting the first embedding and the second embedding into a transformer model; and determining, based at least in part on an output of the transformer model, object detection data associated with the low-visibility area of the environment.

E. The system of paragraph A, the operations further comprising: determining, based at least in part on the long-wave infrared data and the doppler radar data, a sensor data signature associated with the object; and tracking the object over a period of time in the environment, based at least in part on the sensor data signature.

F. A method comprising: receiving infrared sensor data associated with an environment, the infrared sensor data generated by an infrared sensor; receiving radar sensor data associated with the environment, the radar sensor data generated by a radar sensor; determining, based at least in part on the infrared sensor data and the radar sensor data, a combined sensor data view associated with a portion of the environment; determining, based at least in part on the combined sensor data view, an object detection representing an object; and controlling operation of a vehicle, based at least in part on the object detection.

G. The method of paragraph F, wherein determining the combined sensor data view comprises: determining an image representation of the environment based on the infrared sensor data; and projecting a plurality of radar points from the radar sensor data onto the image representation.

H. The method of paragraph F, wherein determining the combined sensor data view comprises: determining a first embedding associated with the infrared sensor data; determining a second embedding associated with the radar sensor data; inputting the first embedding and the second embedding into a machine-learned transformer model; and determining, based at least in part on an output of the machine-learned transformer model, object detection data associated with the portion of the environment.

I. The method of paragraph H, wherein the object detection data includes: a bounding shape representing the object detection within the portion of the environment.

J. The method of paragraph F, wherein the radar sensor data includes a set of radar points associated with the environment, and wherein the combined sensor data view includes: range data associated with the set of radar points; azimuth data associated with the set of radar points; doppler data associated with the set of radar points; and elevation data associated with the set of radar points.

K. The method of paragraph F, wherein determining the object detection comprises: providing the combined sensor data view as input to a trained machine-learned model; and determining a classification associated with the object, based at least in part on an output of the trained machine-learned model.

L. The method of paragraph K, wherein output of the trained machine-learned model includes classification data associated with the object, wherein the classification data includes at least one of: an animal classification; an animal type subclassification; a number of animals subclassification; a pedestrian classification; a number of pedestrians subclassification; or a pedestrian riding a conveyance classification.

M. The method of paragraph F, further comprising: determining, based at least in part on the infrared sensor data and the radar sensor data, a sensor data signature associated with the object; and tracking the object over a period of time in the environment, based at least in part on the sensor data signature.

N. The method of paragraph F, wherein determining the combined sensor data view comprises: determining a visibility metric associated with the portion of the environment; comparing the visibility metric to a visibility threshold; and generating the combined sensor data view based at least in part on determining that the visibility metric is less than the visibility threshold.

O. One or more non transitory computer readable media storing instructions executable by one or more processors, wherein the instructions, when executed, cause the one or more processors to perform operations comprising: receiving infrared sensor data associated with an environment, the infrared sensor data generated by an infrared sensor; receiving radar sensor data associated with the environment, the radar sensor data generated by a radar sensor; determining, based at least in part on the infrared sensor data and the radar sensor data, a combined sensor data view associated with a portion of the environment; determining, based at least in part on the combined sensor data view, an object detection representing an object; and controlling operation of a vehicle, based at least in part on the object detection.

P. The one or more non transitory computer readable media of paragraph O, wherein determining the combined sensor data view comprises: determining an image representation of the environment based on the infrared sensor data; and projecting a plurality of radar points from the radar sensor data onto the image representation.

Q. The one or more non transitory computer readable media of paragraph O, wherein determining the combined sensor data view comprises: determining a first embedding associated with the infrared sensor data; determining a second embedding associated with the radar sensor data; inputting the first embedding and the second embedding into a machine-learned transformer model; and determining, based at least in part on an output of the machine-learned transformer model, object detection data associated with the portion of the environment.

R. The one or more non transitory computer readable media of paragraph O, wherein the radar sensor data includes a set of radar points associated with the environment, and wherein the combined sensor data view includes: range data associated with the set of radar points; azimuth data associated with the set of radar points; doppler data associated with the set of radar points; and elevation data associated with the set of radar points.

S. The one or more non transitory computer readable media of paragraph O, wherein determining the object detection comprises: providing the combined sensor data view as input to a trained machine-learned model; and determining a classification associated with the object, based at least in part on an output of the trained machine-learned model.

T. The one or more non transitory computer readable media of paragraph O, the operations further comprising: determining, based at least in part on the infrared sensor data and the radar sensor data, a sensor data signature associated with the object; and tracking the object over a period of time in the environment, based at least in part on the sensor data signature.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving long-wave infrared data associated with an environment, the long-wave infrared data generated by an infrared sensor;

receiving doppler radar data associated with the environment, the doppler radar data generated by a radar sensor;

determining a low-visibility area of the environment;

determining, based at least in part on the long-wave infrared data and the doppler radar data, a combined sensor data view associated with the low-visibility area of the environment, wherein determining the combined sensor data view is based at least in part on:

determining an image representation of the long-wave infrared data;

determining, based at least in part on a first position of the infrared sensor and a second position of the radar sensor, an overlapping field of view; and projecting, based at least in part on the overlapping field of view, a plurality of radar points onto the image representation based at least in part on:

aligning, based at least in part on the overlapping field of view, the image representation with the doppler radar data; and casting rays from the second position of the radar sensor toward the image representation to determine ray intersection points for individual radar points of the plurality of radar points relative to the image representation;

providing the combined sensor data view as input to a trained machine-learned model;

determining, based at least in part on an output of the trained machine-learned model, an object detection representing an object in the low-visibility area of the environment; and controlling operation of a vehicle, based at least in part on the object detection.

2. The system of claim 1, wherein the output of the trained machine- learned model comprises classification data associated with the object detection, wherein the classification data includes at least one of:

an animal classification;

an animal type subclassification;

a number of animals subclassification;

a pedestrian classification;

a number of pedestrians subclassification; or a pedestrian riding a conveyance classification.

3. The system of claim 1, wherein determining the combined sensor data view comprises:

determining a first embedding associated with the long-wave infrared data;

determining a second embedding associated with the doppler radar data;

inputting the first embedding and the second embedding into a transformer model; and determining, based at least in part on an output of the transformer model, object detection data associated with the low-visibility area of the environment.

4. The system of claim 1, the operations further comprising:

determining, based at least in part on the long-wave infrared data and the doppler radar data, a sensor data signature associated with the object; and tracking the object over a period of time in the environment, based at least in part on the sensor data signature.

5. A method comprising:

receiving infrared sensor data associated with an environment, the infrared sensor data generated by an infrared sensor;

receiving radar sensor data associated with the environment, the radar sensor data generated by a radar sensor;

determining a visibility metric for a portion of the environment;

combining, based at least in part on determining that the visibility metric fails to meet or exceed a threshold, the infrared sensor data and the radar sensor data to generate a combined sensor data view associated with the portion of the environment, wherein generating the combined sensor data view comprises:

determining an image representation of the infrared sensor data;

determining, based at least in part on a first position of the infrared sensor and a second position of the radar sensor, an overlapping field of view; and projecting a plurality of radar points onto the image representation based at least in part on:

aligning the image representation with the radar sensor data; and casting rays from the second position of the radar sensor toward the image representation to determine ray intersection points for individual radar points of the plurality of radar points relative to the image representation;

determining, based at least in part on the combined sensor data view, an object detection representing an object; and controlling operation of a vehicle, based at least in part on the object detection.

6. The method of claim 5, wherein determining the combined sensor data view comprises:

determining a first embedding associated with the infrared sensor data;

determining a second embedding associated with the radar sensor data;

inputting the first embedding and the second embedding into a machine-learned transformer model; and determining, based at least in part on an output of the machine-learned transformer model, object detection data associated with the portion of the environment.

7. The method of claim 6, wherein the object detection data includes:

a bounding shape representing the object detection within the portion of the environment.

8. The method of claim 5, wherein the radar sensor data includes a set of radar points associated with the environment, and wherein the combined sensor data view includes:

range data associated with the set of radar points;

azimuth data associated with the set of radar points;

doppler data associated with the set of radar points; and elevation data associated with the set of radar points.

9. The method of claim 5, wherein determining the object detection comprises:

providing the combined sensor data view as input to a trained machine-learned model; and determining a classification associated with the object, based at least in part on an output of the trained machine-learned model.

10. The method of claim 9, wherein the output of the trained machine-learned model includes classification data associated with the object, wherein the classification data includes at least one of:

an animal classification;

an animal type subclassification;

a number of animals subclassification;

a pedestrian classification;

a number of pedestrians subclassification; or a pedestrian riding a conveyance classification.

11. The method of claim 5, further comprising:

determining, based at least in part on the infrared sensor data and the radar sensor data, a sensor data signature associated with the object; and tracking the object over a period of time in the environ-
ment, based at least in part on the sensor data signature.

12. One or more non-transitory computer-readable media
storing instructions executable by one or more processors,
wherein the instructions, when executed, cause the one or
more processors to perform operations comprising:

receiving infrared sensor data associated with an envi-
ronment, the infrared sensor data generated by an
infrared sensor;

receiving radar sensor data associated with the environ-
ment, the radar sensor data generated by a radar sensor;

determining, based at least in part on providing the
infrared sensor data and the radar sensor data to a
machine-learned transformer model configured to
apply an attention mechanism to sensor embeddings
and to output combined sensor views, a combined
sensor data view associated with a portion of the
environment, wherein generating the combined sensor
data view comprises:

determining an image representation of the infrared sen-
sor data;

determining, based at least in part on a first position of the
infrared sensor and a second position of the radar
sensor, an overlapping field of view; and projecting a plurality of radar points onto the image
representation based at least in part on:

aligning the image representation with the radar sensor
data; and casting rays from the second position of the radar sensor
toward the image representation to determine ray inter-
section points for individual radar points of the plural-
ity of radar points relative to the image representation;

determining, based at least in part on providing the
combined sensor data view to an attention head of the
machine-learned transformer model, an object detec-
tion representing an object; and controlling operation of a vehicle, based at least in part on
the object detection.

13. The one or more non-transitory computer-readable
media of claim 12, wherein determining the combined
sensor data view comprises:

determining a first embedding associated with the infrared
sensor data;

determining a second embedding associated with the
radar sensor data;

inputting the first embedding and the second embedding
into the machine-learned transformer model; and determining, based at least in part on an output of the
machine-learned transformer model, object detection
data associated with the portion of the environment.

14. The one or more non-transitory computer-readable
media of claim 12, wherein the radar sensor data includes a
set of radar points associated with the environment, and
wherein the combined sensor data view includes:

range data associated with the set of radar points;

azimuth data associated with the set of radar points;

doppler data associated with the set of radar points; and elevation data associated with the set of radar points.

15. The one or more non-transitory computer-readable
media of claim 12, the operations further comprising:

determining, based at least in part on the infrared sensor
data and the radar sensor data, a sensor data signature
associated with the object; and tracking the object over a period of time in the environ-
ment, based at least in part on the sensor data signature.

16. The method of claim 5, wherein the visibility metric
is based at least in part on one or more of:

a brightness level associated with the portion of the
environment, a time-of-day, a weather condition associated with the portion of the
environment, or object data determined based on map data associated with
the environment.

17. The one or more non-transitory computer-readable
media of claim 12, wherein the machine-learned transformer
model is configured to output the object detection as at least
one of:

a rendered top-down representation of the environment;
or an image domain representation of the environment.

* * * * *